United States Patent
Morita et al.

(10) Patent No.: US 6,954,333 B2
(45) Date of Patent: Oct. 11, 2005

(54) THIN FILM MAGNETIC HEAD HAVING PARTIAL INSULATING LAYER FORMED ON BOTTOM POLE LAYER THROUGH GAP LAYER AND METHOD OF MANUFACTURING THE SAME

(75) Inventors: Sumihito Morita, Niigata-ken (JP); Naruaki Oki, Niigata-ken (JP); Toshinori Watanabe, Niigata-ken (JP); Hiroko Shinozaki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/688,762

(22) Filed: Oct. 17, 2003

(65) Prior Publication Data

US 2004/0090703 A1 May 13, 2004

Related U.S. Application Data

(62) Division of application No. 09/949,251, filed on Sep. 7, 2001.

(30) Foreign Application Priority Data

Sep. 11, 2000 (JP) ..................................... 2000-274930

(51) Int. Cl.[7] ............................................. G11B 5/127
(52) U.S. Cl. ..................................... 360/126; 360/317
(58) Field of Search .................................. 360/126, 317

(56) References Cited

U.S. PATENT DOCUMENTS

| 5,793,578 A | | 8/1998 | Heim et al. ................. 360/126 |
| 5,850,326 A | * | 12/1998 | Takano et al. .............. 360/122 |
| 6,525,904 B1 | * | 2/2003 | Sasaki ........................ 360/126 |
| 6,557,241 B1 | * | 5/2003 | Sasaki ..................... 29/603.12 |

FOREIGN PATENT DOCUMENTS

| JP | 05-006514 | 1/1993 |
| JP | 08-339508 | 12/1996 |
| JP | 11-350171 | 12/1999 |
| JP | 2000-149219 | 5/2000 |
| JP | 2002-8208 A | 1/2002 |

* cited by examiner

*Primary Examiner*—Tianjie Chen
(74) *Attorney, Agent, or Firm*—Brinks Hofer Gilson & Lione

(57) ABSTRACT

A thin film magnetic head wherein a partial insulating layer is formed on a bottom pole layer with a gap layer provided therebetween, the gap depth Gd being regulated by the distance from a surface facing a recording medium to the partial insulating layer. A magnetic flux partially leaks from a tip region of an upper core layer to the bottom pole layer through the partial insulating layer to effectively suppress magnetic saturation of the tip region, thereby improving the NLTS characteristic and PW50 characteristic, and suppressing the occurrence of side fringing.

2 Claims, 20 Drawing Sheets

THIN FILM MAGNETIC HEAD HAVING PARTIAL INSULATING LAYER FORMED ON BOTTOM POLE LAYER THROUGH GAP LAYER AND METHOD OF MANUFACTURING THE SAME

This application is a divisional application of U.S. application Ser. No. 09/949,251 filed on Sep. 7, 2001, titled "Thin Film Magnetic Head Having Partial Insulating Layer Formed on Bottom Pole Layer Through Gap Layer and Method of Manufacturing the Same."

BACKGROUND OF THE INVENTION

1. Field of the Invention

The present invention relates to a thin film magnetic head comprising a coil layer formed between core layers, and in particular, to a thin film magnetic head capable of appropriately suppressing magnetic saturation and improving the electrical characteristics of a conventional head even with an increase in recording current. The present invention also relates to a method of manufacturing the thin film magnetic head.

2. Description of the Related Art

FIG. 24 is a longitudinal sectional view showing the structure of a conventional thin film magnetic head. This thin film magnetic head is a recording inductive type head that is provided on the trailing-side end of a slider of a floating magnetic head, and which is opposed to a recording medium such as a hard disk or the like, In FIG. 24, reference numeral 1 denotes a lower core layer made of a magnetic material such as a NiFe alloy or the like. Referring to FIG. 24, a gap layer 4 made of a nonmagnetic material such as $Al_2O_3$, $SiO_2$, or the like is formed on the lower core layer 1.

As shown in FIG. 24, a coil layer 5 is spirally formed on the gap layer 4 through an insulating layer 6b made of an organic insulating material. The coil layer 5 is covered with an insulating layer 6c made of an organic insulating material.

Furthermore, an upper core layer 8 made of a magnetic material is formed, for example, by a frame plating method, on the insulating layer 6c, and extends to the portion of the gap layer 4 that is located on the side facing a recording medium.

The tip region 8a of the upper core layer 8 has a width dimension corresponding to a track width Tw in the track width direction. The base end 8c of the upper core layer 8 is connected directly to the lower core layer 1.

The conventional thin film magnetic head shown in FIG. 24 is generally inadequate for use with media having narrower tracks, and has poor overwrite performance. The term "overwrite" (OW) means overwriting, and the OW performance is evaluated by overwriting with a high frequency on the signal recorded with a low frequency, and then measuring a decrease of the residual output of the signal recorded with the low frequency from the output of the signal recorded with the low frequency before overwriting with the high frequency.

FIG. 25 is a longitudinal sectional view showing an improved example of the conventional thin film magnetic head shown in FIG. 24.

As shown in FIG. 25, a bottom pole layer 2 is formed on the lower core layer 1 to protrude in the height direction by a length L1 from the surface facing the recording medium. Referring to FIG. 25, the rear end surface 2a of the bottom core layer 2 protrudes perpendicularly (in the Z direction shown in the drawing) from the lower core layer 1. In the thin film magnetic head shown in FIG. 25, the gap depth is regulated by the length dimension L1 of the bottom pole layer 2.

Furthermore, a first insulating layer 3 is formed behind the rear end surface 2a of the bottom pole layer 2 in the height direction. The first insulating layer 3 is made of a nonmagnetic material, for example, $Al_2O_3$ (alumina), $SiO_2$, or the like.

The upper surface of the first insulating layer 3 comprises a flat plane 3b coplanar with the upper surface of the bottom pole layer 2, and a coil forming concave plane 3a formed behind the flat plane 3b in the height direction.

A coil layer 5 is formed in a spiral pattern on the coil forming plane 3a, and coated with a second insulating layer 6 made of an organic insulating material. Furthermore, the upper core layer 8 is patterned by the frame plating method to extend from the gap layer 4 to the second insulating layer 6.

As shown in FIG. 26, the tip region 8a of the upper core layer 8 is formed with a narrow width corresponding to the track width Tw that extends from the surface facing the recording medium to a dotted line (virtual line) at the end edges 8e. The rear region 8b extending backward from the end edges 8e of the tip region 8a in the height direction is formed so that the width dimension in the track width direction (the X direction shown in the drawing) gradually increases from the track width Tw.

As described above, the first insulating layer 3 formed behind the rear end surface 2a of the bottom pole layer 2 in the height direction has the plane surface 3b coplanar with the upper surface of the bottom pole layer 2, and thus the surface on which the tip region 8a is formed is planarized, thereby facilitating high-precision patterning of the tip region 8a having a track width Tw.

The tip region 8a is exposed at the surface facing the recording medium. Furthermore, the base end 8c of the upper core layer 8 is magnetically connected to the lower core layer 1 through a lifting layer 9 made of a magnetic material. This results in the formation of a magnetic circuit from the upper core layer 8 to the lower core layer 1 through the bottom pole layer 2.

In the writing inductive head, when a recording current is supplied to the coil layer 5, a recording magnetic field is induced in the lower core layer 1 and the upper core layer 8 so that a magnetic signal is recorded on the recording medium, such as a hard disk or the like, by a leakage magnetic field from the magnetic gap between the bottom pole layer 2 magnetically connected to the lower core layer 1 and the tip portion 8a of the upper core layer 8.

The structure of the conventional thin film magnetic head shown in FIG. 25 is more suitable for use with a narrower track and has improved overwrite performance, as compared with the thin film magnetic head shown in FIG. 24.

As described above, the surface on which the tip region 8a of the upper core layer 8 is formed is planarized to cause less adverse effects, such as diffused reflection or the like, during exposure patterning of the tip region 8a by using a resist. Therefore, the tip region 8a can be easily formed with the track width Tw, and a thin film magnetic head can be manufactured capable of complying with the track narrowing that accompanies increases in recording density.

In the structure of the thin film magnetic head shown in FIG. 25, a magnetic flux flowing through the tip region 8a of the upper core layer 8 leaks less from the bottom of the tip region 8a and both end surfaces thereof in the track width direction (the X direction), thereby increasing the magnetic flux density of the tip region 8a to improve the overwrite performance.

Although, as described above, the thin film magnetic head shown in FIG. 25 is more suitable for use with a narrower track and has improved the overwrite performance, the thin film magnetic head still requires improvement in the following points.

As the recording current increases with an increase in the recording density, the magnetic flux density increases locally to easily reach magnetic saturation in the tip region 8a of the upper core layer 8, which is formed with the track width Tw, particularly in the portion near the bottom pole layer 2 at the surface facing the recording medium. Therefore, in actual writing with the thin film magnetic head, the width of magnetization reversal on a magnetization curve is increased to deteriorate the NLTS characteristic and the PW50 characteristic.

The NLTS characteristic represents a phase lead of the leakage magnetic field produced in the magnetic gap between the upper core layer 8 and the bottom pole layer 2. The phase lead is caused by a nonlinear distortion due to the influence of a leakage magnetic field leaking from a magnetic recorded signal recorded on the recording medium toward the head.

The PW50 characteristic represents a measured half width of the reproduced wavelength. The smaller the half width, the more the recording resolution is improved.

In order to solve the above problem, the length dimension L1 of the bottom pole layer 2 in the height direction can be increased. However, the length dimension L1 is a dimension for controlling the gap depth Gd, and thus a change in the length dimension L1 causes changes in various electric properties. Therefore, the ability to change the length dimension L1 is limited.

The problem of magnetic saturation can also be solved by increasing the length dimension L2 of the tip region 8a of the upper core layer 8 in the height direction.

However, lengthening the tip region 8a of the upper core layer 8 deteriorates the overwrite performance, and causes the need to form the tip region 8a, not only on the plane surface 3b formed in the first insulating layer 3, but also on the rising second insulating layer 6.

Therefore, the tip region 8a cannot be formed only on the plane surface 3b, which causes difficulties in forming the tip region 8a with high pattering precision due to the problem of diffused reflection in exposure of the resist.

Also, the tip region 8a of the upper core layer 8 reaches magnetic saturation as described above, and thus a magnetic flux leaks from the surface facing the recording medium in a range wider than the track width Tw to cause the problem of increasing the amount of side fringing.

SUMMARY OF THE INVENTION

The present invention has been achieved for solving the above problems, and an object of the present invention is to provide a thin film magnetic head capable of improving the NLTS characteristic and the PW50 characteristic, and suppressing the occurrence of side fringing, and a method of manufacturing the thin film magnetic head.

A thin film magnetic head according to the present invention comprises a lower core layer, a bottom pole layer formed on the lower core layer separately therefrom or integrally therewith, a nonmagnetic gap layer formed on at least the bottom pole layer, an upper core layer to be joined to the top of the gap layer at a surface facing a recording medium, and a coil layer formed behind the bottom pole layer in the height direction for inducing a recording magnetic field in the lower core layer and the upper core layer. Wherein the upper core layer comprises a tip region exposed with a track width at the surface facing the recording medium, and a rear end region extending backward from the end edge of the tip region in the height direction so that the width dimension in the track width direction gradually increases in the height direction. Further wherein the space between the tip region of the upper core layer and the bottom pole layer comprises a portion extending backward from the surface facing the recording medium in the height direction, in which only a gap layer is present. A gap depth is regulated by the end edge of the portion, and a portion extending backward from the end edge in the height direction, in which an insulating layer is present together with the gap layer, or with the gap layer removed, so that the gap between the tip region and the bottom pole layer in the portion comprising the insulating layer is larger than the gap in the portion comprising only the gap layer.

In the thin film magnetic head of the present invention, only the gap layer is interposed in a portion of the space between the bottom pole layer and the tip region of the upper core layer, and the insulating layer is also interposed behind the gap layer in the height direction together with the gap layer or with the gap layer removed. The gap between the bottom pole layer and the upper core layer in the portion comprising the insulating layer is larger than that in the portion comprising only the gap layer. Thus, in the portion comprising the insulating layer, a magnetic flux from the tip region partly leaks to the bottom pole layer through the insulating layer.

Therefore, unlike a conventional head, in the present invention, the magnetic flux flowing through the tip region partly leaks to the bottom pole layer to prevent the magnetic flux density from being locally increased in the tip region, particularly in a portion near the bottom pole layer at the surface facing the recording medium. The thin film magnetic head of the present invention thus has a structure in which the tip region is less likely to reach magnetic saturation. Therefore, in actual writing with the thin film magnetic head of the present invention, the width of magnetization reversal on a magnetization curve can be decreased to improve the NLTS characteristic and the PW50 characteristic as compared with a conventional head.

In the present invention, the gap depth is regulated by the end edge of the portion comprising only the gap layer between the bottom pole layer and the upper core layer, and thus, the length dimension of the bottom pole layer in the backward height direction does not participate in setting the gap depth. Accordingly, the length dimension of the bottom pole layer can be freely changed.

In the present invention, the magnetic saturation of the tip region of the upper core layer can properly maintain the leakage magnetic field within the track width when a magnetic flux leaks from the tip region at the surface facing the recording medium, thereby preventing leakage from both sides of the track width. Therefore, the occurrence of side fringing can be better suppressed, as compared with the conventional head.

Furthermore, in the present invention, even when the tip region of the upper core layer has the same length dimension as a conventional head, the magnetic saturation of the tip region can be effectively suppressed to permit the formation of the tip region only on the plane surface, thereby permitting easy patterning of the tip region with high precision. Also, a good overwrite performance can be maintained.

The thin film magnetic head of the present invention preferably has a specific structure in which the insulating layer comprises a partial insulating layer formed on the bottom pole layer through the gap layer or directly on the bottom pole layer, and the gap depth is regulated by the distance between the bottom of the medium-facing surface-side end of the partial insulating layer and the medium-facing surface, the tip region of the upper core layer being formed to extend from the gap layer to the partial insulating layer.

In the present invention, as described above, the partial insulating layer is interposed between the bottom pole layer and the tip region of the upper core layer to effectively and easily increase the space between the bottom pole layer and the tip region. In this construction, the gap depth is determined by the distance between the bottom of the recording medium-facing surface-side end of the partial insulating layer and the medium-facing surface. Therefore, unlike the conventional head, the length dimension of the bottom pole layer in the height direction does not participate in setting the gap depth, and thus the length dimension of the bottom pole layer in the height direction can be freely determined. The length dimension of the bottom pole layer is preferably determined with consideration of the amount of magnetic flux leaking from the tip region to the bottom pole layer through the partial insulating layer, the leakage magnetic flux changing with the magnitude of a recording current and the thickness of the partial insulating layer.

In the present invention, the thickness of the partial insulating layer is preferably 0.1 $\mu$m to 1.0 $\mu$m. Alternatively, the thickness of the partial insulating layer is preferably 1 to 10 times the thickness of the gap layer.

In the present invention, the partial insulating layer is present on the surface on which the tip region of the upper core layer is formed, and thus the forming surface is not a completely planarized surface. However, with the partial insulating layer having a thickness dimension in the above dimension range, the partial insulating layer has substantially no influence on the formation of the tip region, thereby permitting high-precision patterning of the tip region.

With the partial insulating layer having a thickness dimension larger than the above range, the tip region cannot be patterned with high precision. In addition, the amount of the magnetic flux leaking to the bottom pole layer side is decreased and fails to effectively suppress the magnetic saturation in the tip region. With the partial insulating layer having a thickness dimension smaller than the above range, the amount of the magnetic flux leaking from the tip region to the bottom pole layer through the insulating layer is increased so as to excessively deteriorate the overwrite performance.

In the present invention, the end surface of the partial insulating layer on the medium-facing surface side thereof is preferably inclined or curved so that the thickness of the partial insulating layer increases in the backward height direction, with the top of the partial insulating layer being planarized. This facilitates high-precision patterning of the tip region of the upper core layer on the partial insulating layer.

In the present invention, a first insulating layer is preferably formed between the bottom pole layer and the lower core layer, the partial insulating layer being formed on the bottom pole layer and the first insulating layer through the gap layer or directly thereon.

In this way, by forming the first insulating layer between the lower core layer and the bottom pole layer, the partial insulating layer and the tip region of the upper core layer can be easily formed in predetermined shapes with high precision.

In the present invention, a planarized surface is preferably formed at the top of the first insulating layer, and is continued from the upper surface of the bottom pole layer, with the partial insulating layer being formed on the planarized surface. This enables the formation of the partial insulating layer and the tip region of the upper core layer having a predetermined shape with higher precision.

In the present invention, a coil forming surface is preferably formed in a portion of the first insulating layer that is located behind the planarized surface in the height direction and lower than the planarized surface, with the coil layer being formed on the coil forming surface through the gap layer or directly. This arrangment can decrease the amount of rising of the second insulating layer formed on the coil layer from the planarized surface, thereby facilitating patterning of the upper core layer and shortening the length from the medium-facing surface of the upper core layer to the base end. Therefore, the magnetic circuit from the upper core layer to the lower core layer can be shortened to permit a decrease in inductance, and a thin film magnetic head adaptable to higher recording frequencies can be manufactured.

In the present invention, the partial insulating layer preferably comprises an organic insulating layer.

In the present invention, the length dimension of the bottom pole layer from the surface facing the recording medium in the height direction is preferably 0.5 $\mu$m to 3.0 $\mu$m.

In the conventional thin film magnetic head shown in FIG. 25, the gap depth is regulated by the length direction of the bottom pole layer in the height direction, and thus the length dimension cannot be freely changed. In the conventional head, the length dimension of the bottom pole layer is about 1.2 $\mu$m.

On the other hand, in the present invention, the partial insulating layer is provided on the bottom pole layer so that the gap depth is regulated by the length of the partial insulating layer from the bottom of the front end surface to the surface facing the recording medium. Thus, the length dimension of the bottom pole layer in the height direction does not participate in the setting of the gap depth. Therefore, in the present invention, an allowance can be imparted to the setting of the length dimension of the bottom pole layer.

In the present invention, the reason for setting the length dimension of the bottom pole layer to 0.5 $\mu$m to 3.0 $\mu$m is that with a length dimension of 0.5 $\mu$m or less, like in the conventional head, the magnetic flux flowing through the tip region leaks minimally from the bottom of the tip region to the bottom pole layer because of the small volume of the bottom pole layer opposed to the tip region of the upper core layer. Thus the tip region reaches magnetic saturation, and thereby fails to effectively improve the NLTS characteristic and the PW50 characteristic.

With the bottom pole layer having a length dimension of 3.0 $\mu$m or more, the amount of the magnetic flux flowing from the tip region of the upper core layer to the bottom pole layer through the partial insulating layer is increased, thereby excessively decreasing the magnetic flux density of the tip region and deteriorating the overwrite performance.

In the present invention, the height dimension of the bottom pole layer is preferably 0.3 µm to 2.0 µm. This will increase the volume of the bottom pole layer, and suppress magnetic saturation of the tip region of the upper core layer.

With the bottom pole layer having a height dimension in the above range, the bottom pole layer can be easily patterned in a predetermined shape, and the coil forming concave surface can be easily formed with a predetermined depth dimension in the first insulating layer, which is formed behind the partial insulating layer in the height direction. Therefore, the height of the second insulating layer, which is formed on and coats the coil forming surface, can be decreased to facilitate pattering of the upper core layer in the predetermined shape.

Although, as described above, the partial insulating layer is inserted between the bottom pole layer and the tip region of the upper core layer in order to effectively suppress magnetic saturation of the tip region, the following means can also be used for suppressing the magnetic saturation.

The rear end surface of the bottom pole layer may be inclined or curved so that the thickness of the bottom pole layer gradually decreases in the backward height direction, the gap depth being regulated by the distance between the top of the rear end surface and the surface facing the recording medium. In this case, the first insulating layer may be formed to extend from the top of the rear end surface of the bottom pole layer to the lower core layer, and the planarized surface may be formed at the top of the first insulating layer so as to be continued from the top of the bottom pole layer. Also, the tip region of the upper core layer may be formed to extend from the gap layer formed on the bottom pole layer to the gap layer formed on the planarized surface, or to the planarized surface.

In this case, the rear end surface of the bottom pole layer is inclined or curved so that the thickness of the bottom pole layer gradually decreases in the backward height direction, and the portion between the bottom pole layer and the tip region of the upper core layer comprises a portion comprising only the gap layer. In the portion behind the portion comprising only the gap layer, the first insulating layer formed on the rear end surface of the bottom pole layer is interposed between the bottom pole layer and the tip region of the upper core layer so that the gap between the bottom pole layer and the tip region in the portion comprising the first insulating layer is larger than that in the portion comprising only the gap layer.

Therefore, in the thin film magnetic head, a part of the magnetic flux flowing through the tip region of the upper core layer leaks from the tip region to the rear end surface of the bottom pole layer through the first insulating layer to suppress magnetic saturation of the tip region. It is thus possible to improve the NLTS characteristic and the PW50 characteristic, and suppress the occurrence of side fringing, as compared with a conventional magnetic head.

Also, the surface on which the tip region of the upper core layer is formed can be completely planarized to permit high-precision patterning of the tip region with the track width, and thus a thin film magnetic head adaptable to a narrower tack can be manufactured.

Furthermore, the first insulating layer preferably has a coil forming surface which is formed behind the planarized surface in the height direction and lower than the planarized surface, the coil layer being formed on the coil forming surface through the gap layer or directly. As a result, the rising of the second insulating layer formed on the coil layer from the planarized surface can be decreased to facilitate patterning of the upper core layer and shorten the length from the medium-facing surface of the upper core layer to the base end. Therefore, the magnetic path from the upper core layer to the lower core layer can be shortened to permit a decreased inductance, and a thin film magnetic head adaptable to a higher recording frequency can be manufactured.

In the present invention, the gap depth is preferably 0.3 µm to 2.0 µm. This gap depth can maintain the various electric properties of the thin film magnetic head in a sufficient state.

In the present invention, the bottom pole layer preferably has a higher saturation magnetic flux density than the lower core layer. This can improve the overwrite performance.

In the present invention, the bottom pole layer preferably comprises a laminate of at least two magnetic layers, wherein the nearer the magnetic layer is to the gap layer, the higher the saturation magnetic flux density.

In the present invention, at least the tip region of the upper core layer preferably comprises a laminate of at last two magnetic layers, wherein the nearer the magnetic layer is to the gap layer, the higher the saturation magnetic flux density. This can improve the overwrite performance.

In the present invention, the gap layer preferably has a track width at the surface facing the recording medium, and the portion of the bottom pole layer, which contacts the gap layer, preferably has a width dimension corresponding to the track width. This can more effectively suppress the occurrence of side fringing.

In the present invention, the width dimension of the tip region of the upper core layer in the track width direction preferably corresponds to the track with Tw, or gradually increases from the surface facing the recording medium to the end edge. This can concentrate the magnetic flux in the vicinity of the gap to improve recording performance.

A method of manufacturing a thin film magnetic head of the present invention comprises:

(a) the step of forming a bottom pole layer on a lower core layer with a predetermined length from a surface facing a recording medium in the height direction;

(b) the step of forming a first insulating layer on the bottom pole layer and the lower core layer, and then planarizing the upper surfaces of the bottom pole layer and the first insulating layer to the same plane;

(c) the step of forming a nonmagnetic gap layer at least on the bottom pole layer;

(d) the step of forming a partial insulating layer on the bottom pole layer with the gap layer provided therebetween to start from a position at a predetermined distance from the surface facing the recording medium and regulate a gap depth by the predetermined distance;

(e) the step of forming a coil layer on a portion of the first insulating layer that is located behind the partial insulating layer in the height direction, and coating the coil layer with a second insulating layer;

(f) the step of forming an upper core layer on the gap layer, the partial insulating layer and the second insulating layer, wherein the upper core layer comprises a narrow tip region formed on the gap layer and the partial insulating layer to be exposed with a track width at the surface facing the recording medium, and a rear end region formed on the second insulating layer so that the width dimension in the track width direction gradually increases in the backward height direction from the end edge of the tip region.

The above-described manufacturing method of the present invention can easily form the partial insulating layer in the predetermined shape at a predetermined position, and form the upper core layer with high pattering precision.

In the thin film magnetic head produced by the manufacturing method of the present invention, the tip region of the upper core layer has substantially the same length as the conventional head, and even with this length dimension, magnetic saturation of the tip region can be appropriately suppressed. Therefore, the NLTS characteristic and the PW50 characteristic can be improved, and a thin film magnetic head producing less side fringing can be manufactured.

In the present invention, in the step (d), the partial insulating layer is preferably formed to extend to the top of the first insulating layer. This permits the length dimension of the partial insulating layer in the height direction to be freely changed. Also, the height-direction length dimension of the tip region of the upper core layer formed on the partial insulating layer can be freely changed, thereby increasing the length dimension of the tip region, and appropriately suppressing magnetic saturation of the tip region.

In the present invention, the partial insulating layer preferably comprises an organic insulating layer.

Furthermore, the step (g) below is preferably provided between the steps (b) and (c), and the step (h) below is preferably used instead of the step (e).

(g) The step of cutting the top of the first insulating layer behind the bottom pole layer in the height direction to form a coil forming surface.

(h) The step of forming a coil layer on the coil forming surface, and coating the coil layer with a second insulating layer.

Therefore, the rising of the second insulating layer from the upper surface of the bottom pole layer, which is considered a reference plane, can be decreased to permit high-precision patterning of the upper core layer on the gap layer, the partial insulating layer and the second insulating layer.

DESCRIPTION OF THE PREFERRED EMBODIMENTS

Figure 1:
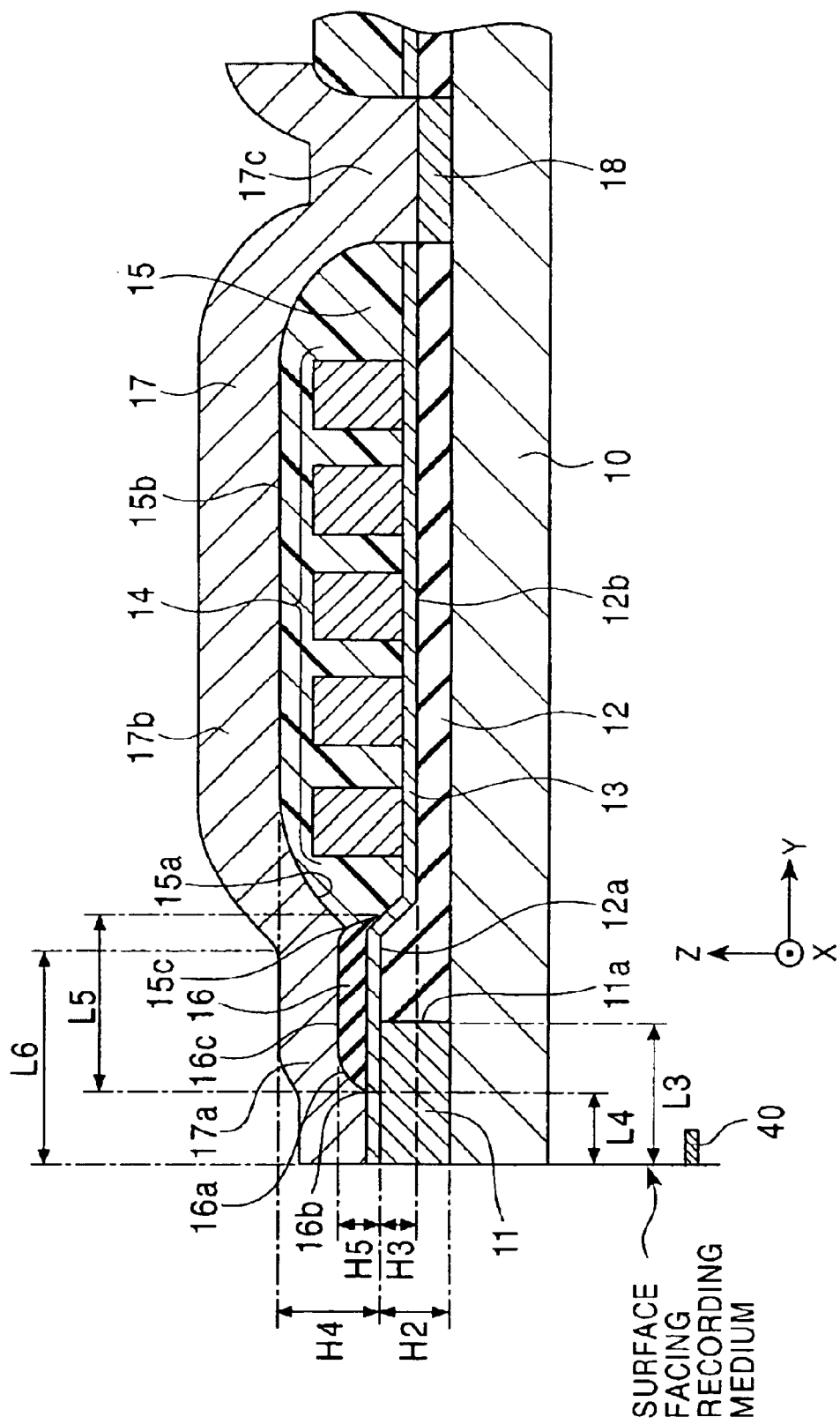
FIG. 1 is a longitudinal sectional view showing the structure of a thin film magnetic head according to an embodiment of the present invention.
Figure 2:
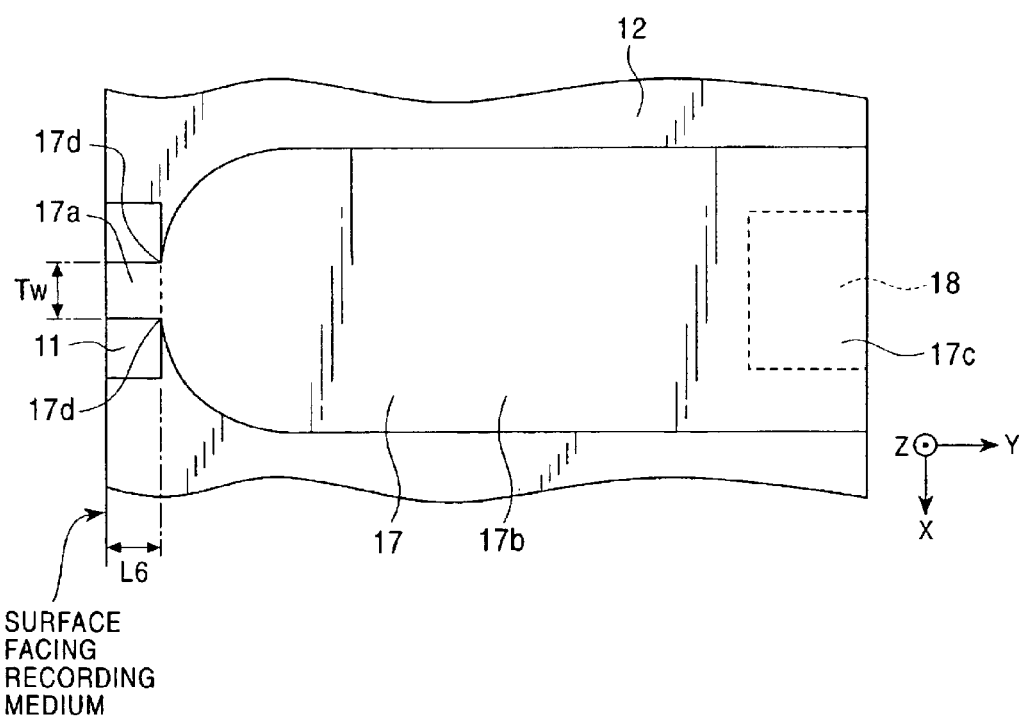
FIG. 2 is a partial plan view of the thin film magnetic head shown in FIG. 1.

FIG. 1 is a longitudinal sectional view of a thin film magnetic head according to a first embodiment of the present invention, and FIG. 2 is a plan view of the thin film magnetic head shown in FIG. 1.

The thin film magnetic head shown in FIGS. 1 and 2 is a recording inductive head, but it may be a so-called combined type thin film magnetic head comprising the inductive head and a reproducing head (MR head) utilizing a magnetoresistive effect and laminated below the inductive head.

In FIG. 1, reference numeral 10 denotes a lower core layer made of, for example, a magnetic material such as permalloy or the like. In a case in which a reproducing head is laminated below the lower core layer 10, a shield layer may be provided separately from the lower core layer 10 for protecting a magnetoresistive element from noise, or the lower core layer 10 may be used as an upper shield layer for the reproducing head without the shield layer.

Referring to FIG. 1, a bottom pole layer 11 is formed on the lower core layer 10. Like the lower core layer 10, the bottom pole layer 11 is exposed at a surface facing a recording medium, and the lower surface of the bottom pole layer 11 is magnetically connected to the lower core layer 10.

In the embodiment shown in FIG. 1, the rear end surface 11a of the bottom pole layer 11 extends from the lower core layer 10 in the vertical direction (the Z direction shown in the drawing).

The bottom pole layer 11 is preferably formed separately from the lower core layer 10 to simplify the manufacturing process. However, the bottom pole layer 11 may be formed integrally with the lower core layer 10.

With the bottom pole layer 11 formed separately from the lower core layer 10, the bottom pole layer 11 may be made of a material which is the same as or different from the lower core layer 10. However, in order to increase the recording density, the bottom pole layer 11 is preferably made of a magnetic material having a higher saturation magnetic flux density than the lower core layer 10.

The bottom pole layer 11 may comprise a laminated structure comprising at last two magnetic layers. In this case, the materials are preferably selected for the respective magnetic layers so that the saturation magnetic flux density increases toward a gap layer 13 (which will be described below).

As shown in FIG. 1, the bottom pole layer 11 is formed with a length dimension L3 in the height direction (the Y direction shown in the drawing), the length dimension L3 being preferably 0.5 $\mu$m to 3.0 $\mu$m.

In a conventional magnetic head, a gap depth Gd is regulated by the length dimension of the bottom pole layer 11. However, in the present invention, a partial insulating layer 16 described below is formed so that the length dimension L3 of the bottom pole layer 11 does not participate in setting the gap depth Gd.

Therefore, in the present invention, the length dimension L3 of the bottom pole layer 11 in the height direction can be relatively freely set. In the present invention, as described above, the bottom pole layer 11 can be formed with a length dimension L3 of 0.5 $\mu$m to 3.0 $\mu$m, which is longer than the length dimension of the bottom pole layer of the conventional magnetic head in the height direction, thereby gaining the volume of the bottom pole layer 11. As a result, and as described below, a part of the magnetic flux from the tip region 17a of the upper core layer 17 easily leaks to the bottom pole layer 11 through the partial insulating layer 16 and the gap layer 13, whereby magnetic saturation of the tip region 17a can be appropriately suppressed.

With the bottom pole layer 11 having a length dimension L3 of over 3.0 $\mu$m, the region of the bottom pole layer 11 to which the magnetic flux leaks from the tip region 17a is too extended to increase excessively the amount of the leakage magnetic flux. Therefore, the magnetic flux density of the tip region 17a rapidly decreases to undesirably deteriorate the overwrite performance.

On the other hand, with a length dimension L3 of less than 0.5 $\mu$m, the region of the bottom pole layer 11 to which the magnetic flux leaks from the tip region 17a is too decreased to decrease excessively the amount of the leakage magnetic flux. Therefore, like in the conventional head, magnetic saturation of the tip region 17a cannot be effectively suppressed, thereby causing deterioration in the NLTS characteristic and the PW50 characteristic, or the occurrence of side fringing.

The height dimension H2 of the bottom pole layer 11 is preferably 0.3 $\mu$m to 2.0 $\mu$m. With the height dimension H2 in this numerical range, the amount of the leakage magnetic flux from the tip region 17a of the upper core layer 17 to the bottom pole layer 11 can be maintained at a level which avoids the tip region 17a from reaching magnetic saturation, and the formation of the bottom pole layer 11 can be facilitated. Also, a coil forming surface 12b can be formed in the first insulating layer 12 within a predetermined depth dimension from the upper surface of the bottom pole layer 11 to decrease rising of the second insulating layer 15 that is coated on the coil layer 14, which is formed on the foil forming surface 12b, thereby permitting high-precision patterning of the upper core layer 17.

As shown in FIG. 1, the first insulating layer 12 is formed on the portion of the lower core layer 10 that is behind the rear end surface 11a of the bottom pole layer 11 in the height direction. As shown in FIG. 2, the first insulating layer 12 is also formed on both sides of the bottom pole layer 11 in the track width direction (the X direction shown in the drawing).

Referring to FIG. 1, a planarized surface 12a, coplanar with the upper surface of the bottom pole layer 11, is preferably formed at the top of the first insulating layer 12, and starts from the rear end surface 11a of the bottom pole layer 11.

Furthermore, the coil forming surface 12b is preferably formed behind the planarized surface 12a in the height direction, and is located at a position lower than the planarized surface 12a by one step. The height dimension H3 of the step is preferably 0.2 $\mu$m to 1.9 $\mu$m. With the step in this numerical range, magnetic and electric insulation between the lower core layer 10 and a coil layer 14 (described below) can be appropriately achieved. Also, the coil layer 14 can be formed at a position lower than the upper surface of the bottom pole layer 11, which is considered a reference surface, to increase the height dimension of the coil layer 14, thereby decreasing the width dimension of the coil layer 14. Therefore, the length dimension from the medium-facing surface of the upper core layer 17 to the base end thereof can be shortened to realize a short magnetic path.

The first insulating layer 12 may be made of an inorganic insulating material or an organic insulating material, but from the viewpoint of simplification of the manufacturing process, the first insulating layer 12 is preferably made of an inorganic insulating material because of the work of polishing the upper surface of the first insulating layer 12 by a CMP technique as described below with respect to the manufacturing method.

As the inorganic insulating material, at least one material can be selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Next, as shown in FIG. 1, the gap layer 13 is formed on the bottom pole layer 11 and the first insulating layer 12. The thickness of the gap layer 13 is preferably 0.05 $\mu$m to 0.5 $\mu$m. The thickness of the gap layer 13 appears as a gap length G1 at the surface facing the recording medium.

The thin film magnetic head can maintain its function as long as the gap layer 13 is formed on at least the bottom pole layer 11, but the gap layer 13 is preferably formed to extend to the upper surface of the first insulating layer 12 from the viewpoint of the manufacturing process.

However, when the gap layer 13 is formed only on the bottom pole layer 11, the coil layer 14 described below can be formed directly on the first insulating layer 12. Thus, the gap layer 13 can be made of a nonmagnetic conductive material such as NiP or the like, thereby imparting a degree of design freedom to the construction material of the gap layer 13.

Next, the coil layer 14 is spirally formed, through the gap layer 13, on the coil forming surface 12b formed at the top of the first insulating layer 12. The coil layer 14 is preferably made of a material having a low electric resistance value, such as Cu or the like.

As described above, the gap layer formed below the coil layer 14 must be made of a nonmagnetic and electrically insulating material. However, when the gap layer 13 is made of, for example, a conductive material such as NiP or the like, a nonmagnetic and electrically insulating layer (not shown) is formed on the gap layer 13, and the coil layer 14 is formed on the gap layer 13, for maintaining magnetic and electric insulation between the coil layer 14 and the gap layer 13.

As shown in FIG. 1, the coil layer 14 is coated with the second insulating layer 15. The second insulating layer 15 is preferably made of an organic insulating material such as resist, polyimide, or the like.

The end surface 15a of the second insulating layer 15, on the medium-facing surface side thereof, is inclined or curved so that the thickness of the second insulating layer 15 gradually increases in the height direction, and the upper surface 15b of the second insulating layer 15 is planarized.

In the embodiment shown in FIG. 1, the coil layer 14 is formed on the coil forming concave surface 12b formed in the first insulating layer 12, and thus the height dimension H4 of the second insulating layer 15, which rises from the upper surface of the bottom pole layer 11 (considered as a reference plane), is not so increased, thereby permitting high-precision patterning of the upper core layer 17 in a predetermined shape.

Next, as shown in FIG. 1, the partial insulating layer 16 is formed on the gap layer 13, which in turn is formed on the bottom pole layer 11. The partial insulating layer 16 is formed to extend backward in the height direction from the position at the predetermined distance L4 from the surface facing the recording medium in the height direction (the Y direction). In the embodiment shown in FIG. 1, the partial insulating layer 16 is also formed on the gap layer 13, not only on the bottom pole layer 11, but also on the first insulating layer 12. Without the gap layer 13 formed on the first insulating layer 12, the partial insulating layer 16 is formed directly on the first insulating layer 12.

Referring to FIG. 1, the bottom 16b of the front end surface 16a of the partial insulating layer 16 is brought nearer to the surface facing the recording medium than the rear end surface 11a of the bottom pole layer 11. Therefore, the gap depth Gd is regulated by the distance between the bottom 16b and the surface facing the recording medium, i.e., the predetermined distance L4.

In this way, the gap depth Gd is regulated by the forming position of the partial insulating layer 16, and thus the length dimension L3 of the bottom pole layer 11 in the height direction does not participate in setting the gap depth Gd. Therefore, the length dimension L3 of the bottom pole layer 11 can be relatively freely set.

In the present invention, the gap depth Gd is preferably 0.3 µm to 2.0 µm. Since the gap depth Gd greatly influences the various electrical properties of the thin film magnetic head, the gap depth Gd must be set in the predetermined numerical range. Therefore, the forming portion of the partial insulating layer 16 is determined in conformity with the above numerical range.

The thickness H5 of the partial insulating layer 16 is preferably 0.1 µm to 1.0 µm. Alternatively the thickness H5 of the partial insulating layer 16 is preferably 1.0 to 10 times the thickness of the gap layer 13.

With the partial insulating layer 16 having a thickness H5 over the above numerical range, a large step is formed between the gap layer 13 and the partial insulating layer 16, thereby causing the problem of failing to pattern the tip region 17a of the upper core layer 17 on the partial insulating layer 16 in the predetermined shape starting from the top of the gap layer 13.

Also, the magnetic flux from the tip region 17a leaks very little from the tip region 17a to the bottom pole layer 11 through the partial insulating layer 16 and the gap layer 13, thereby causing the problem of failing to effectively suppress magnetic saturation of the tip region 17a.

On the other hand, with the partial insulating layer 16 having a thickness H5 of less than the above numerical range, the magnetic flux from the tip region 17a leaks excessively to the bottom pole layer 11 to rapidly decrease the magnetic flux density of the tip region 17a, thereby undesirably deteriorating the overwrite performance.

With the partial insulating layer 16 having a thickness H5 within the above numerical range, the tip region 17a of the upper core layer 17 can be patterned with high precision, and the magnetic flux from the tip region 17a leaks to the bottom pole layer 11 in an amount which does not rapidly deteriorate the overwrite performance, thereby appropriately suppressing magnetic saturation of the tip region 17a.

The thickness H5 has a correlation with the length dimension L3 of the bottom pole layer 11 in the height direction, and the partial insulating layer 16 is preferably formed thick when the bottom pole layer 11 has a large length dimension L3. This is because, with the partial insulating layer 16 having a small thickness, the amount of the magnetic flux leaking from the tip region 17a to the bottom pole layer 11 is liable to increase.

On the other hand, when the bottom pole layer 11 has a small length dimension L3 in the height direction, even with the small thickness of the partial insulating layer 16, the amount of the magnetic flux leaking from the tip region 17a to the bottom pole layer 11 is not increased excessively. Therefore, the thickness of the partial insulating layer 16 can be decreased.

The maximum length dimension L5 of the partial insulating layer 16 in the height direction is preferably 0.2 µm to 2.0 µm.

In the embodiment shown in FIG. 1, the first insulating layer 12 has the planarized surface 12a coplanar with the upper surface of the bottom pole layer 11 and extending from the rear end of the bottom pole layer 11, and thus the partial insulating layer 16 is formed on the continuous planarized surface comprising the upper surface of the bottom pole layer 11 and the planarized surface 12a of the first insulating layer 12, to facilitate the formation of the partial insulating layer 16 in the predetermined shape.

In the present invention, as shown in FIG. 1, the front end surface 16a of the partial insulating layer 16 at the surface facing the recording medium is preferably inclined or curved so that the thickness of the partial insulating layer 16 gradually increases in the backward height direction, and the upper surface 16c of the partial insulating layer 16 is preferably planarized in parallel with the gap layer 13.

As a result, the upper core layer 17 can be formed on the partial insulating layer 16 with high patterning precision.

In the present invention, the partial insulating layer 16 is preferably made of an organic insulating material such as resist, polyimide, or the like. Although the partial insulating layer 16 may be made of an inorganic insulating material, the use of an inorganic insulating material requires a sputtering step and an etching step to complicate the formation of the partial insulating layer 16. Also, the etching step undesirably influences the other layers.

In the use of an organic insulating material for forming the partial insulating layer 16, the partial insulating layer 16 can be formed by only a coating step and a baking step, thereby simplifying the formation of the partial insulating layer 16 and causing less adverse effect on the layers other than the partial insulating layer 16 in the step of forming the partial insulating layer 16.

As shown in FIG. 1, the bottom 15c of the tip surface 15a of the second insulating layer 15 must be in contact with the top of the partial insulating layer 16. This enables the formation of a continuous upper core layer forming surface extending from the gap layer 13 to the partial insulating layer 16 and the second insulating layer 15, thereby permitting high-precision patterning of the upper core layer 17 in a predetermined shape.

Since the position on the partial insulating layer 16 where the bottom 15c is formed is related to the length dimension L6 of the tip region 17a of the upper core layer 17 in the height direction, the forming position of the bottom 15c of the second insulating layer 15 must be determined in conformity with the predetermined length dimension L6.

Next, as shown in FIG. 1, the upper core layer 17 is patterned on the gap layer 13, the partial insulating layer 16 and the second insulating layer 15 by, for example, a frame plating process.

The base end 17c of the upper core layer 17 is connected to a lifting layer (back gap layer) 18, made of a magnetic material and formed on the lower core layer 10 to form a magnetic circuit from the upper core layer 17 to the lower core layer 10.

As shown in FIG. 2, the upper core layer 17 comprises the narrow tip region 17a formed with a width dimension corresponding to the track width Tw in the track width direction to extend from the surface facing the recording medium in the height direction (the Y direction shown in the drawing). Referring to FIG. 2, the tip region 17a represents the region ranging from the surface facing the recording medium to a dotted virtual line in the height direction.

Furthermore, the rear end region (yoke portion) 17b is formed to start from the end edges 17d of the tip region 17a so that the width dimension gradually increases in the backward height direction.

Preferably, the tip region 17a has the length dimension L6 in the height direction, and the width dimension of the tip region 17a in the track width direction corresponds to the track width Tw over the length dimension L6. However, because of the problem of patterning precision, the width dimension of the tip region 17a may be set to slightly larger than the track width Tw in the region from the surface facing the recording medium to the end edges 17d. However, if the difference from the track width Tw is 10% or less relative to the track width Tw, substantially no influence occurs on the electric properties to permit the realization of a narrower track.

As shown in FIG. 1, the tip region 17a is patterned on the gap layer 13 and the partial insulating layer 16, while the rear end region 17b is mainly patterned on the second insulating layer 15.

In the present invention, the length dimension L6 of the tip region 17a in the height direction is preferably 1.5 μm to 4.0 μm.

With the length dimension L6 of less than 1.5 μm, the tip region 17a undesirably reaches magnetic saturation. On the other hand, with the length dimension L6 of over 4.0 μm, the tip region 17a is possibly formed on the tip surface 15a of the second insulating layer 15, thereby undesirably causing difficulties in patterning the tip region 17a.

As shown in FIG. 1, the tip region 17a of the upper core layer 17 is opposed to the bottom pole layer 11, with the gap layer 13 provided therebetween at the surface facing the recording medium to form a magnetic gap between the tip region 17a and the bottom pole layer 11.

In the inductive head shown in FIG. 1, when a recording current is supplied to the coil layer 14, a recording magnetic field is induced in the lower core layer 10 and the upper core layer 17 so that a magnetic signal is recorded on the recording medium such as a hard disk or the like by a leakage magnetic field from the magnetic gap between the bottom pole layer 11 magnetically connected to the lower core layer 10 and the tip region 17a of the upper core layer 17.

In the structure of the present invention, as shown in FIG. 1, the space between the tip region 17a of the upper core layer 17 and the bottom pole layer 11 comprises the portion extending from the surface facing the recording medium in the height direction, in which only the gap layer 13 is present. The gap depth is regulated by the end edge of the portion comprising only the gap layer 13. The space between the tip region 17a and the bottom pole layer 11 further comprises the portion behind the end edge of the portion comprising only the gap layer 13, in which both the gap layer 13 and the partial insulating 16 are present. Therefore, the gap between the bottom pole layer 11 and the tip region 17a, in the portion comprising the partial insulating layer 16, is larger than that in the portion comprising only the gap layer 13.

In the thin film magnetic head of the present invention, therefore, a part of the magnetic flux flowing through the tip region 17a leaks to the bottom pole layer 11 through the partial insulating layer 16 and the gap layer 13 to decrease the magnetic flux density of the tip region 17 as compared with a conventional head, thereby permitting effective suppression of magnetic saturation of the tip region 17a, even when the recording current is increased. Therefore, in writing with the thin film magnetic head of the present invention shown in FIG. 1, the width of magnetization reversal in a magnetization curve can be decreased to improve the NLTS characteristic and the PW50 characteristic.

Since the tip region 17a does not reach magnetic saturation, the leakage magnetic flux between the tip region 17a and the bottom pole layer 11 at the surface facing the recording medium can be maintained within the track width Tw, thereby preventing the leakage magnetic flux from the tip region 17a from extending beyond the track width. Therefore, the occurrence of side fringing can be more suppressed than in the conventional head.

Furthermore, in the present invention, the partial insulating layer 16 is provided between the bottom pole layer 11 and the tip region 17a without increasing the length dimension L6 of the tip region 17a of the upper core layer 17 in the height direction as compared with the conventional head. As a result, the NLTS characteristic and the PW50 characteristic can be improved, and the occurrence of side fringing can be suppressed. Therefore, the tip region 17a can be formed on the substantially planarized surface to permit high-precision patterning of the tip region 17a. Namely, the present invention can obtain narrowing of the track.

In the embodiment shown in FIG. 1, the magnetic flux density of the tip region 17a is decreased in comparison to the conventional head. However, the decrease in the magnetic flux density influences an operation less, and the improvement in the structure of the upper core layer 17 and the bottom pole layer 11 can concentrate the magnetic flux in the vicinity of the gap, thereby achieving the overwrite performance which is same as or higher than the conventional head.

In this embodiment, as described above, the bottom pole layer 11 shown in FIG. 1 is made of a magnetic material having a higher saturation magnetic flux density than the lower core layer 10 in order to improve the overwrite performance.

Figure 3:
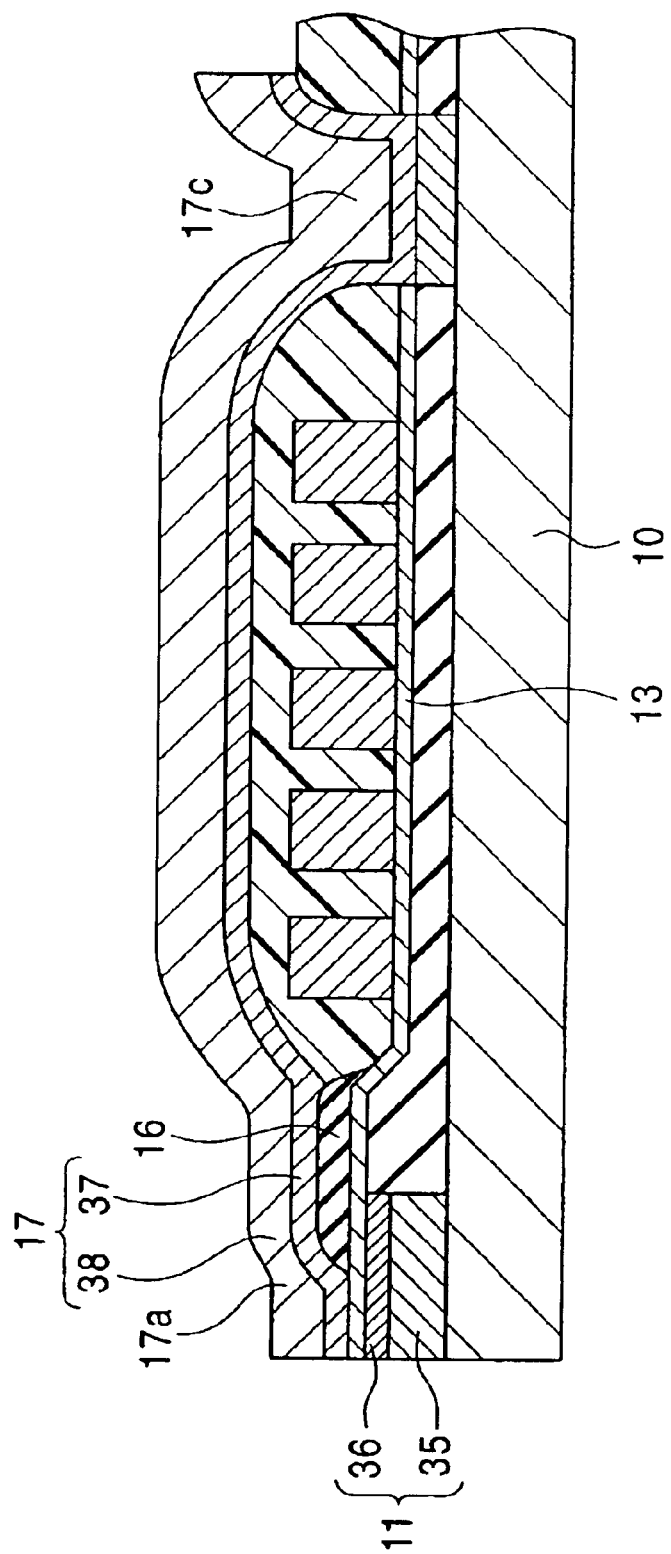
FIG. 3 is a longitudinal sectional view showing the structure of a thin film magnetic head according to another embodiment of the present invention.

The embodiment shown in FIG. 3 can also achieve an improvement in the overwrite performance.

In the embodiment shown in FIG. 3, the bottom pole layer 11 formed on the lower core layer 10 comprises two layers, and the upper core layer 17 also comprises two layers.

Of the two magnetic layers 35 and 36 that constitute the bottom pole layer 11, the magnetic layer 36 formed in contact with the gap layer 13 is made of a magnetic material having a higher saturation magnetic flux density than the magnetic layer 35 formed in contact with the lower core layer 10.

Of the two magnetic layers 37 and 38 that constitute the upper core layer 17, the magnetic layer 37 formed in contact with the gap layer 13 is made of a magnetic material having a higher saturation magnetic flux density than the magnetic layer 38 formed on the magnetic layer 37.

For example, each of the magnetic layers 36 and 37 comprise a $Ni_{50}Fe_{50}$ alloy (numerical value by at %), and each of the magnetic layers 35 and 38 comprise a $Ni_{80}Fe_{20}$ alloy (numerical value by at %). Therefore, the saturation magnetic flux densities of the magnetic layers 36 and 37 can be made higher than the magnetic layers 35 and 38.

The thickness of each of the magnetic layers 36 and 37 formed in contact with the gap layer and having higher saturation magnetic flux densities is preferably 0.3 μm or more.

By providing magnetic layers having higher saturation magnetic flux densities in contact with the gap layer, as described above, the magnetic flux can be concentrated near the gap, and the overwrite performance can be improved.

In the embodiment shown in FIG. 3, each of the bottom pole layer 11 and the upper core layer 17 has a two-layer structure, but a three-layer structure may be used. In this case, magnetic materials are preferably used so that the saturation magnetic flux density increases as the magnetic layer approaches the gap layer 13.

Although the upper core layer 17 comprises the two magnetic layers in the region from the surface facing the recording medium to the base end 17c, the magnetic layer 37 having a higher saturation magnetic flux density may be formed only in the narrow tip region 17a.

Figure 4:
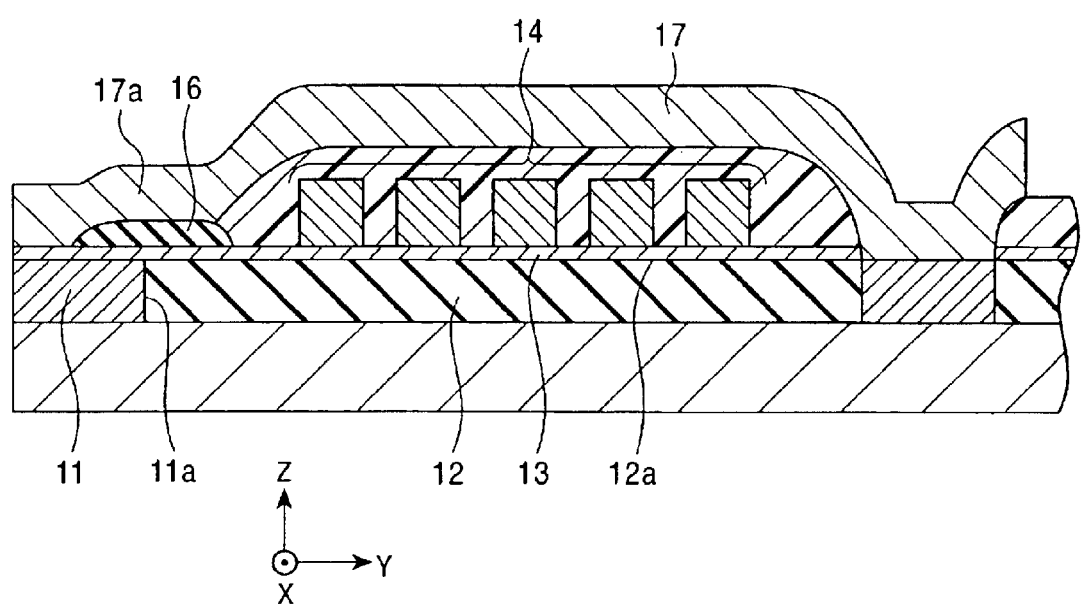
FIG. 4 is a longitudinal sectional view showing the structure of a thin film magnetic head according to still another embodiment of the present invention.

FIG. 4 is a longitudinal sectional view of a thin film magnetic head according to another embodiment of the present invention.

In the thin film magnetic head shown in FIG. 4, the coil forming concave surface 12b shown in FIG. 1 is not formed in the first insulating layer 12 formed to extend backward from the rear end surface 11a of the bottom pole layer 11 in the height direction (the Y direction shown in the drawing), but only the planarized surface 12a continued from the upper surface of the bottom pole layer 11 is formed at the top of the first insulating layer 12. The coil layer 14 is spirally formed on the first insulating layer 12 with the gap layer 13 provided therebetween.

In this embodiment, the coil forming surface 12b shown in FIG. 1 need not be formed, thereby facilitating the manufacturing process in comparison to the embodiment of FIG. 1.

Also, the partial insulating layer 16 shown in FIG. 4 can be formed on the planarized surface, and the partial insulating layer 16 and the tip region 17a of the upper core layer 17 formed on the partial insulating layer 16 can be formed in predetermined shapes with high precision.

Figure 5:
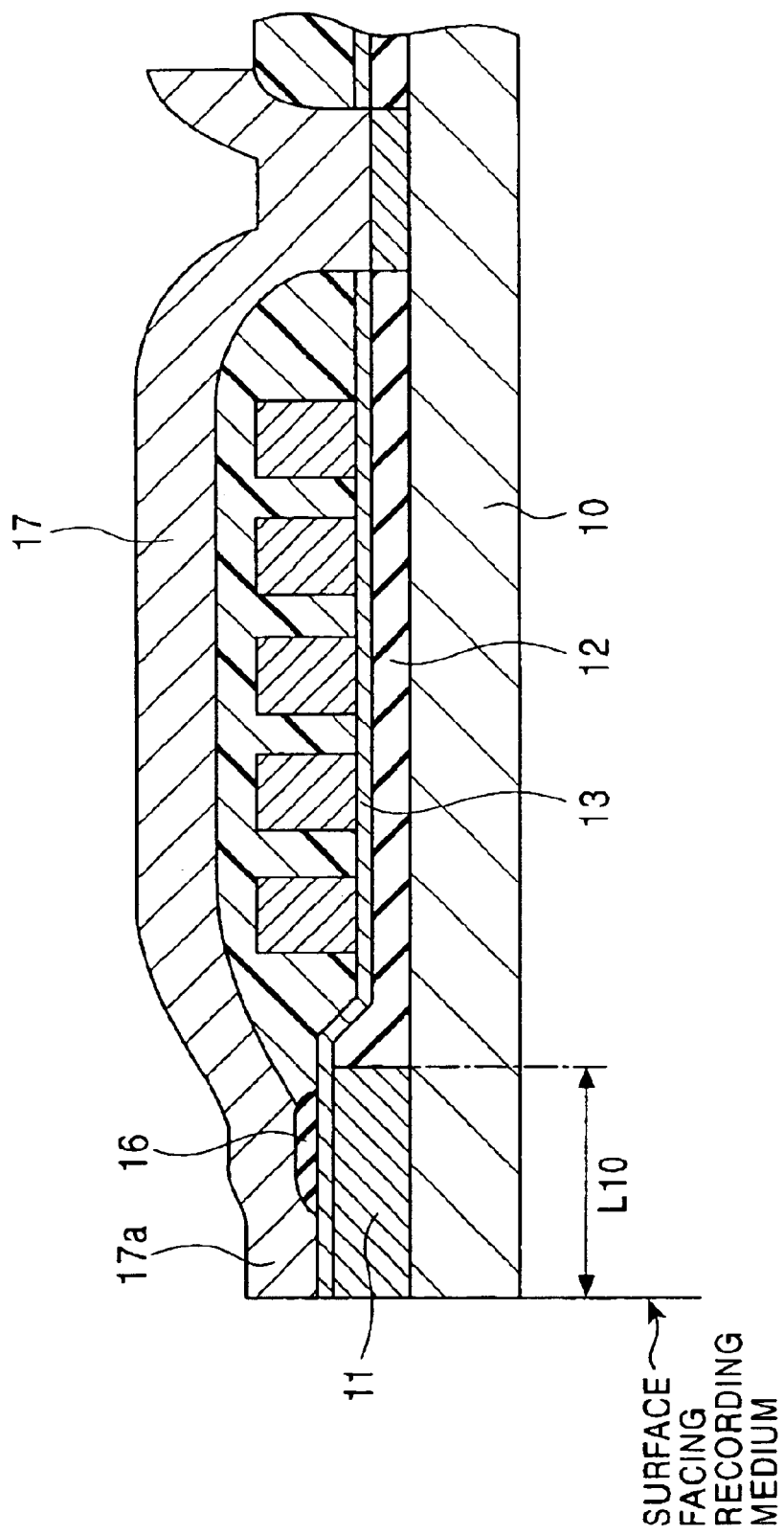
FIG. 5 is a longitudinal sectional view showing the structure of a thin film magnetic head according to a further embodiment of the present invention.

FIG. 5 is a longitudinal sectional view showing the structure of a thin film magnetic head according to still another embodiment of the present invention.

FIG. 5 is different from FIG. 1 only in the shape of the partial insulating layer 16. Namely, the partial insulating layer 16 shown in FIG. 1 is formed not only on the bottom pole layer 11 but also on the first insulating layer 12 through the gap layer 13. However, in the thin film magnetic head shown in FIG. 5, the partial insulating layer 16 is formed only on the bottom pole layer 11, with the gap layer 13 provided therebetween.

Like in the structure shown in FIG. 1, in the structure shown in FIG. 5, a part of the magnetic flux flowing through the tip region 17a of the upper core layer 17 leaks to the bottom pole layer 11 through the partial insulating layer 16 to appropriately suppress magnetic saturation of the tip region 17a. Therefore, the NLTS characteristic and the PW50 characteristic can be improved, and the occurrence of side fringing can be suppressed, as compared with the conventional head.

The structure of the thin film magnetic head shown in FIG. 5 is particularly effective for cases in which the planarized surface 12a shown in FIG. 1 is not formed in the first insulating layer 12 formed behind the rear end of the bottom pole layer 11, or in which the first insulating layer 12 is not formed. In this case, the partial insulating layer 16 shown in FIG. 5 can be securely formed on the planarized surface.

In the embodiment shown in FIG. 5, the bottom pole layer 11 preferably has a length dimension L10 in the height direction, which is longer than the length dimension L3 shown in FIG. 1 to secure a wide region where the tip region 17a of the upper core layer 17 is formed.

Figure 6:
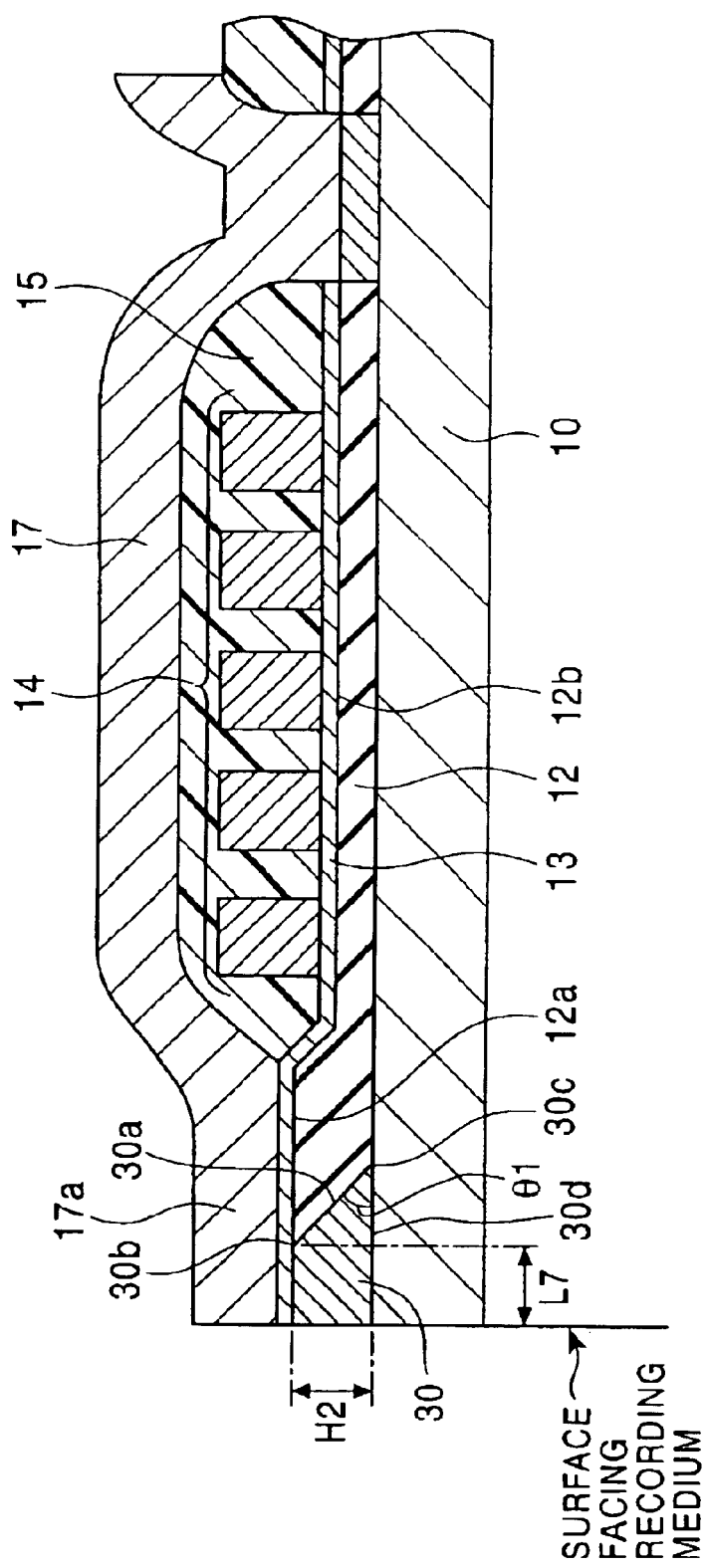
FIG. 6 is a longitudinal sectional view showing the structure of a thin film magnetic head according to a still further embodiment of the present invention.
Figure 7:
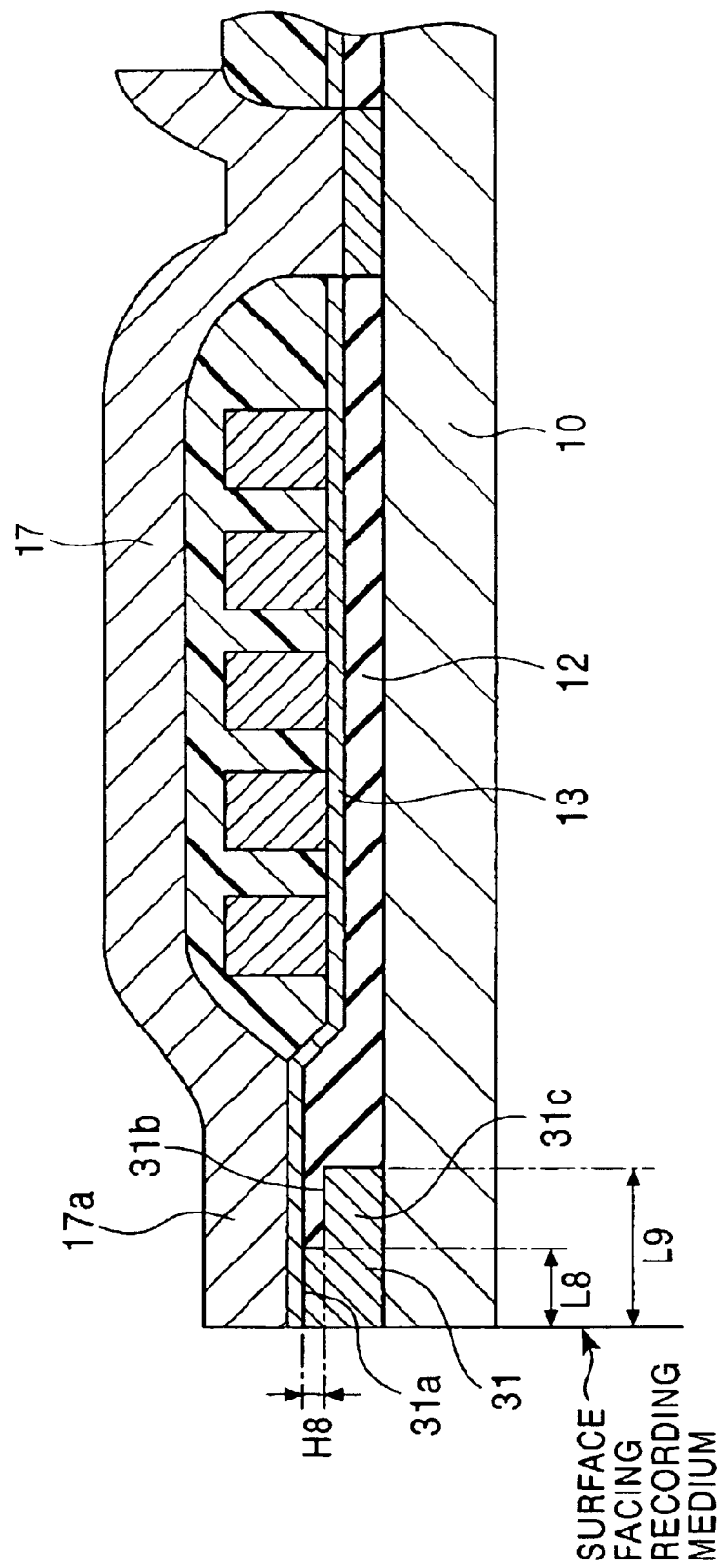
FIG. 7 is a longitudinal sectional view showing the structure of a thin film magnetic head according to a further embodiment of the present invention.

FIGS. 6 and 7 are longitudinal sectional views each showing a thin film magnetic head in which the shape of a bottom pole layer is changed without the partial insulating layer shown in FIGS. 1 to 5 to suppress magnetic saturation of the tip region 17a of the upper core layer 17.

In FIG. 6, a bottom pole layer 30 is formed on the lower core layer 10 to protrude therefrom, but the rear end surface 30a of the bottom pole layer 30 is inclined so that the thickness of the bottom pole layer 30 gradually decreases in the height direction (the Y direction shown in the drawing). Therefore, the gap depth Gd is regulated by the distance L7 from the top 30b of the rear end surface 30a to the surface facing the recording medium. The rear end surface 30a may be curved.

In the embodiment shown in FIG. 6, the first insulating layer 12 is formed on the rear end surface 30a of the bottom pole layer 30 and on the lower core layer 10, and the planarized surface 12a is formed at the top of the first insulating layer 12 to be continued from the upper surface of the bottom pole layer 30.

The tip region 17a of the upper core layer 17 is patterned on the bottom pole layer 30 and the planarized surface 12a of the first insulating layer 12 with a gap layer provided therebetween. In a case in which the gap layer 13 is formed only on the bottom pole layer 30, the tip region 17a is formed directly on the planarized surface 12a.

Like in the embodiments shown in FIGS. 1 to 5, in this embodiment, the space between the bottom pole layer 30 and the tip region 17a of the upper core layer 17 comprises a portion in which only the gap layer 13 is present. The gap depth Gd is regulated by the end edge of the portion comprising only the gap layer 13. The space between the bottom pole layer 30 and the tip region 17a further comprises a portion behind the end edge of the portion comprising only the gap layer 13, in which both the gap layer 13 and the first insulating 12 are present. Therefore, the gap between the bottom pole layer 30 and the tip region 17a, in the portion comprising the first insulating layer 12, is larger than that in the portion comprising only the gap layer 13.

Therefore, a part of the magnetic flux flowing through the tip region 17a of the upper core layer 17 leaks to the rear end surface 30a of the bottom pole layer 30 through the first insulating layer 12 and the gap layer 13 to decrease the magnetic flux density of the tip region 17a, thereby permitting suppression of magnetic saturation of the tip region 17a even when the recording current is increased. Therefore, the NLTS characteristic and the PW50 characteristic can be improved, and the occurrence of side fringing can be appropriately suppressed, as compared with the conventional head.

In this embodiment, the partial insulating layer 16 is not provided on the bottom pole layer 30 and the first insulating layer 12, and thus the surface on which the tip region 17a of the upper core layer 17 can be completely planarized to permit high-precision patterning of the tip region 17a in the predetermined shape.

In the embodiment shown in FIG. 6, the distance L7 from the top 30b of the rear end surface 30a of the bottom pole layer 30 to the surface facing the recording medium is preferably 0.5 $\mu$m to 3.0 $\mu$m. As described above, the gap depth Gd is regulated by this value.

Furthermore, the angle θ1 between the rear end surface 30a and the bottom 30d of the bottom pole layer 30 is preferably 20° to 90°. With an angle θ1 above this numerical range, the magnetic flux does not appropriately leak from the tip region 17a to the rear end surface 30a of the bottom pole layer 30 through the first insulating layer 12 to effectively suppress magnetic saturation of the tip region 17a. With the angle θ1 of less than this numerical range, the bottom pole layer 30 cannot be easily formed, and the magnetic flux leaking from the tip region 17a to the rear end surface 30a of the bottom pole layer 30 is excessively to cause deterioration in the overwrite increased performance.

The height dimension of the bottom pole layer 30 is the same as the height dimension H2 shown in FIG. 1, and all dimensions, such as the length dimension of the tip region 17a of the upper core layer 17, etc., are also the same as described above with reference to FIG. 1.

Referring to FIG. 6, the coil forming surface 12b is preferably formed in the first insulating layer 12 to be located behind the planarized surface 12a in the height direction (the Y direction shown in the drawing) at a position lower than the planarized surface 12a, the coil layer 14 being formed on the coil forming surface 12b with the gap layer 13 provided therebetween. In the case in which the gap layer 13 is not formed on the coil forming surface 12b, the coil layer 14 is formed directly on the coil forming surface 12b.

By forming the coil forming concave surface 12b at the top of the first insulating layer 12, the amount of rising of the second insulating layer 15 coated on the coil layer 14 from the top of the bottom pole layer 30 can be decreased to permit high-precision patterning of the upper core layer 17 in the predetermined shape on the gap layer 13 and the second insulating layer 15.

In the thin film magnetic head of the embodiment shown in FIG. 7, a bottom pole layer 31 comprises a rear end portion 31c formed to be lower than the upper surface 31a by a step 31b, and to project backward in the height direction.

In this embodiment, the gap depth Gd is regulated by the length dimension L8 of the upper surface 31a of the bottom pole layer 31 in the height direction. Also, the first insulating layer 12 formed between the lower core layer 10 and the bottom pole layer 31 is formed on the rear end portion 31c (corresponding to the step 31b) of the bottom pole layer 31 to form the planarized surface 12a continued from the upper surface 31a of the bottom pole layer 31 at the top of the first insulating layer 12.

The gap layer 13 is formed on the bottom pole layer 31 and the first insulating layer 12, and the tip region 17a of the upper core layer 17 is patterned on the bottom pole layer 31 and the planarized surface 12a formed in the first insulating layer 12 through the gap layer 13.

In this embodiment, a part of the magnetic flux flowing through the tip region 17a of the upper core layer 17 leaks to the rear end portion 31c of the bottom pole layer 31 through the gap layer 13 and the first insulating layer 12 to decrease the magnetic flux density of the tip region 17a as compared with the conventional head, thereby appropriately suppressing magnetic saturation of the tip region 17a. Therefore, the NLTS characteristic and the PW50 characteristic can be improved, and the occurrence of side fringing can be effectively suppressed in comparison to a conventional head.

The length L9 of the rear end portion 31c of the bottom pole layer 31 in the height direction from the surface facing the recording medium is preferably 0.2 $\mu$m to 2.0 $\mu$m. This causes an appropriate leakage magnetic flux from the tip region 17a of the upper core layer 17 to the rear end portion 31c of the bottom pole layer 31 to appropriately suppress magnetic saturation of the tip region 17a.

The height dimension H8 of the step 31b formed in the bottom pole layer 31 is preferably 0.1 $\mu$m to 1.0 $\mu$m, or 1 to 10 times the thickness of the gap layer 13. The reason for this is the same as the thickness dimension H4 of the partial insulating layer 16 shown in FIG. 1.

Figure 8:
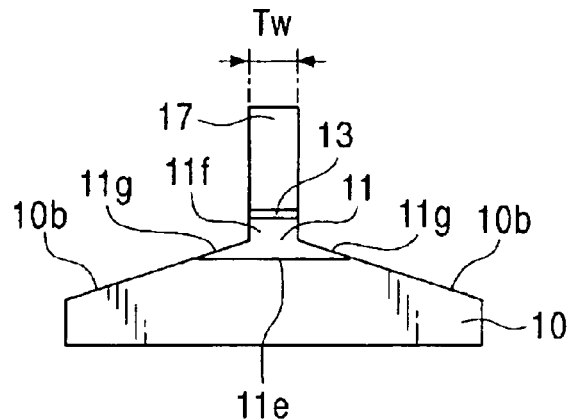
FIG. 8 is a partial front view of a thin film magnetic head according a further embodiment of the present invention.
Figure 9:
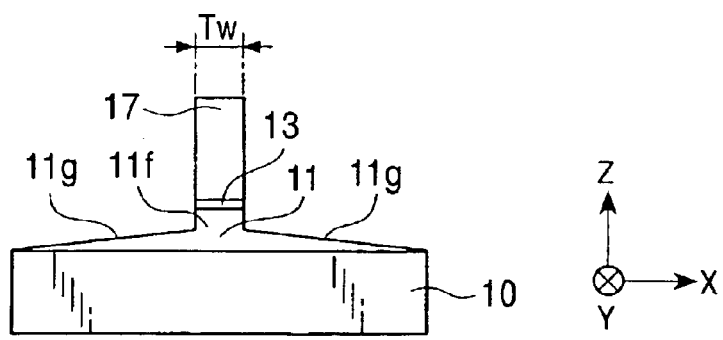
FIG. 9 is a partial front view showing a thin film magnetic head according to a further embodiment of the present invention.
Figure 10:
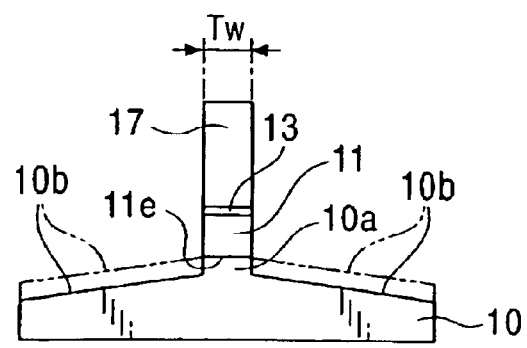
FIG. 10 is a partial front view showing a thin film magnetic head according to a further embodiment of the present invention.

FIGS. 8 to 10 are partial front views each showing the structure of a thin film magnetic head exposed at the surface facing the recording medium. The front view of each of FIGS. 8 to 10 shows the thin film magnetic head shown in any one of FIGS. 1 to 7. Although the bottom pole layer is denoted by reference numeral 11 in FIGS. 8 to 10, the bottom pole layer is denoted by reference numerals 30 and 31 in front views of the thin film magnetic heads shown in FIGS. 6 and 7, respectively.

In FIG. 8, the gap layer 13, sandwiched between the upper core layer 17 (formed with the track width Tw) and the bottom pole layer 11, is formed with the track width Tw at the surface facing the recording medium, and the surface of the bottom pole layer 11, which is joined to the gap layer 13, is formed with the track width Tw.

In this embodiment, a protrusion 11f is formed on the bottom pole layer 11 to extend toward the upper core layer 17 and have a width dimension smaller than that of the bottom 11e in contact with the lower core layer 10, the top of the protrusion 11f formed with the track width being joined to the gap layer 13.

The bottom pole layer 11 also has inclined surfaces 11g formed to extend from the base end of the protrusion 11f to both sides in the track width direction so that they are inclined away from the upper core layer 17.

Furthermore, the lower core layer 10 has inclined surfaces 10b formed at the top thereof to extend to both sides in the track width direction so that they are continued from the inclined surfaces 11g formed in the bottom pole layer 11.

In the embodiment shown in FIG. 9, like in the embodiment shown in FIG. 8, the gap layer 13 is formed with the track width Tw, and the bottom pole layer 11 has the protrusion 11f having the surface formed with the track width to be joined to the gap layer 13, and the inclined surfaces 11g are formed to extend from the base end of the protrusion to both sides so that they are inclined away from the upper core layer 17.

In this embodiment, the inclined surfaces 11g are formed on the bottom pole layer 11, but the inclined surfaces 10b shown in FIG. 8 are not formed on the lower core layer 10.

In the embodiment shown in FIG. 10, the gap layer 13, sandwiched between the upper core layer 17 and the bottom pole layer 11, is formed with the track width Tw, and the surface of the bottom pole layer 11, which is joined to the gap layer 13, is formed with the track width Tw.

In the embodiment shown in FIG. 10, at the surface facing the recording medium, the bottom pole layer 11 has a rectangular shape in which the bottom 11e joined to the lower core layer 11 has the track width Tw. Alternatively, at the surface facing the recording medium, the bottom pole layer 11 may have a trapezoidal shape in which the width dimension of the bottom 11e is larger than the track width Tw.

Furthermore, as shown in FIG. 10, the lower core layer 10 has a protrusion 10a having the sides continued from both sides of the bottom pole layer 11, and inclined surfaces 10b formed to extend from the base end of the protrusion 10a toward both sides in the track width direction so that they are inclined away from the upper core layer 17.

In the present invention, the protrusion 10a may not be formed in the lower core layer 10, as shown by dotted lines, so that the inclined surfaces 10b are formed to extend from the base end of the bottom pole layer 11 to both sides.

At the surface facing the recording medium, the protrusion 11f of the bottom pole layer 11 shown in FIG. 8 or 9, and the protrusion 10a of the lower core layer 10 shown in FIG. 10, may be formed in a rectangular shape in which the width dimension is constant from the top to the base end, or a trapezoidal shape in which the width dimension of the base end is larger than the top.

For example, in each of the embodiments shown in FIGS. 9 and 10, the upper surfaces of the bottom pole layer 11 and the lower core layer 10 may be formed in parallel with the track width direction (the X direction) without the inclined surfaces 10b and 11g.

When the lower core layer 10 and the bottom pole layer 11 are integrally formed, the bottom pole layer 11 is preferably formed in the shape of a protrusion integrally with the lower core layer 10. In this case, the inclined surfaces 10b are preferably, formed at the top of the lower core layer 10 to extend from the base end of the bottom pole layer 11 to both sides in the track width direction so that the inclined surfaces 10b are inclined away from the upper core layer.

As shown in FIGS. 8 to 10, the surface of the bottom pole layer 11, which is joined to the gap layer 13, is formed with the track width Tw, and the protrusion 11f or the inclined surfaces 11g are formed, or the protrusion 10a or the inclined surfaces 10b are formed in the lower core layer 10, so that the upper surface of the bottom pole layer 11 or the lower core layer 10 can be appropriately separated from the upper core layer, thereby appropriately suppressing the occurrence of side fringing and realizing a narrower track.

The track width Tw is preferably in the range of 0.3 $\mu$m to 1.0 $\mu$m.

As described above, in the present invention, the space between the tip region 17a of the upper core layer 7 and the bottom pole layer 11 (30 or 31) comprises the portion extending from the surface facing the recording medium in the height direction, in which only the gap layer 13 is present, the gap depth being regulated by the end edge of the portion; and the portion extending backward from the end edge in the height direction, in which the insulating layer is present together with the gap layer 13 or without the gap layer 13. Therefore, the gap between the tip region 17a and the bottom pole layer 11 in the portion comprising the insulating layer is larger than that in the portion comprising only the gap layer 13. In the embodiments of the present invention shown in FIGS. 1 to 5, the partial insulating layer 16 is provided as the insulating layer, and in the embodiments shown in FIGS. 6 and 7, the rear end surface of the bottom pole layer is modified, and the first insulating layer 12 is provided as the insulating layer. However, the present invention is not limited to these embodiments.

For example, the second insulating layer 15 coated on the coil layer 14 may be interposed as the insulating layer between the bottom pole layer 11 and the tip region 17a to increase the gap between the bottom pole layer 11 and the tip region 17a. In this case, the second insulating layer 15 interposed between the bottom pole layer 11 and the tip region 17a is smoothly sagged by baking to form a flat as possible surface on which the tip region 17a is formed. This is preferred because the tip region 17a can be patterned in the predetermined shape with high precision.

The method of manufacturing the thin film magnetic head of the present invention shown in FIG. 1 will be described below.

Figure 11:
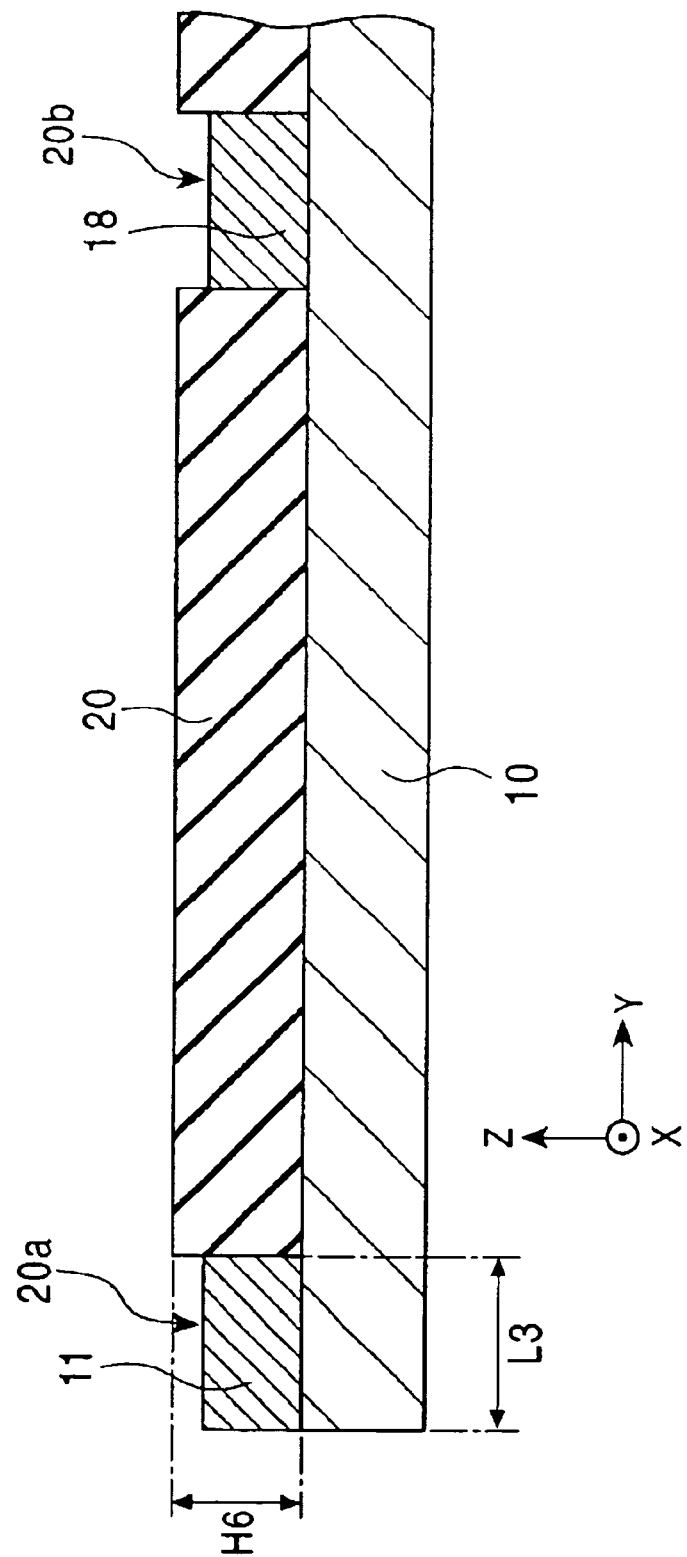
FIG. 11 is a partial sectional view showing a step in a method of manufacturing the thin film magnetic head shown in FIG. 1.

In the step shown in FIG. 11, a resist layer 20 having a height dimension H6 is coated on the lower core layer 10. The height dimension H6 must be larger than the height dimension H2 of the bottom pole layer 11 shown in FIG. 1. Then, an aperture pattern 20a having a length L3 from the surface facing the recording medium in the height direction is formed in the resist layer 20 by exposure. Also, an aperture pattern 20b is formed in a portion of the resist layer 20, behind the resist layer 20 in the height direction.

Then, a magnetic material layer is grown by plating in each of the aperture patterns 20a and 20b. The magnetic material layer formed in the aperture pattern 20a serves as the bottom pole layer 11, and the magnetic material layer formed in the aperture pattern 20b serves as the lifting layer 18. Then, the resist layer 20 is removed.

Figure 12:
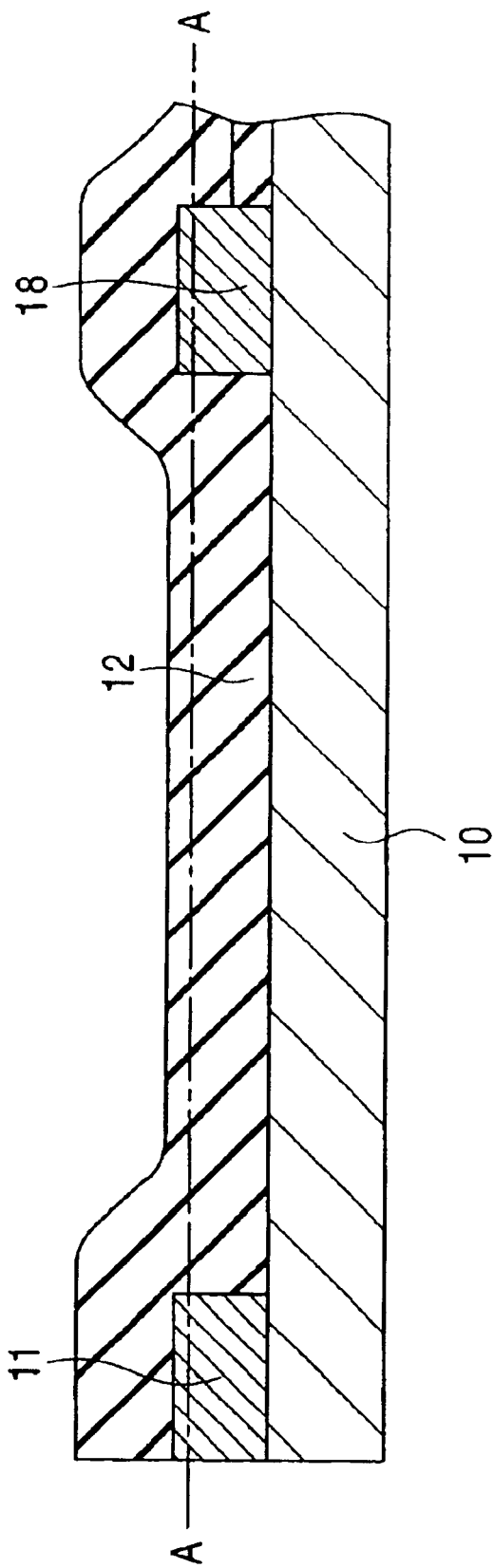
FIG. 12 is a partial sectional view showing a manufacturing step after the step shown in FIG. 11.

In the step shown in FIG. 12, the first insulating layer 12 is formed on the bottom pole layer 11, the lower core layer 10 and the lifting layer 18. The first insulating layer 12 is preferably made of an inorganic insulating material. This is because the surface of the first insulating layer 12 is polished in the next step.

Next, as shown in FIG. 12, the first insulating layer 12 is polished to line A—A by a polishing operation using, for example, a CMP process. In this polishing step, not only the first insulating layer 12, but also portions of the upper surfaces of the bottom pole layer 11 and the lifting layer 18 are polished.

In this polishing step, the upper surfaces of the bottom pole layer 11, the first insulating layer 12 and the lifting layer 18 are polished to the same plane.

In this step, the height dimension of the bottom pole layer 11 is set to H2 shown in FIG. 1.

Figure 13:
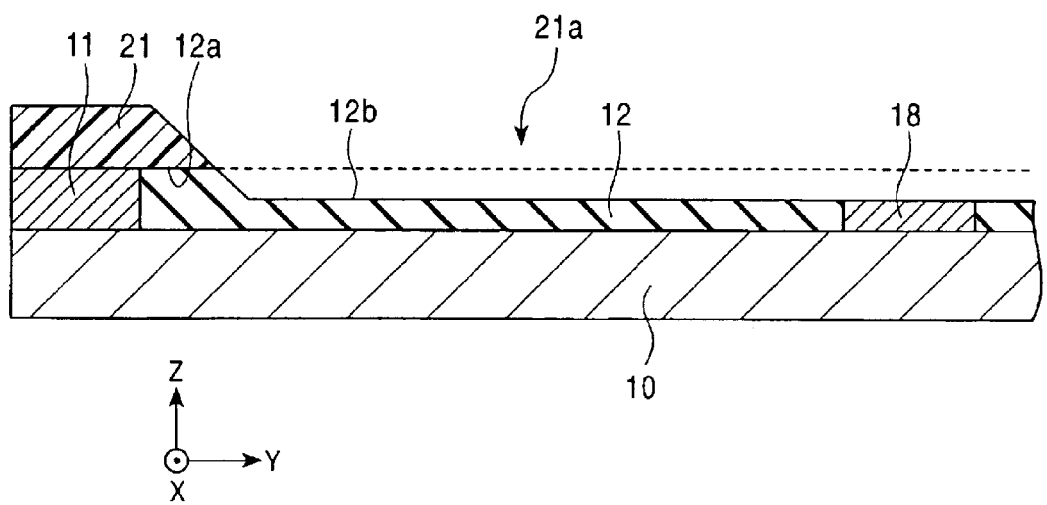
FIG. 13 is a partial sectional view showing a manufacturing step after the step shown in FIG. 12.

In the step shown in FIG. 13, a resist layer 21 is formed on the bottom pole layer 11 and the first insulating layer 12. Then, an aperture pattern 21a is formed in the resist layer 21 behind the bottom pole layer 11 in the height direction (the Y direction shown in the drawing) to be located above the first insulating layer 12.

By forming the aperture pattern 21a, the resist layer 21 is left on the upper surface of the bottom pole layer 11 and a portion of the upper surface of the first insulating layer 12.

Next, the first insulating layer 12 and the lifting layer 18 exposed in the aperture pattern 21a of the resist layer 21 are partly removed by etching (a portion denoted by the dotted line). As a result, the coil forming concave surface 12b is formed in the first insulating layer 21. At the same time, the upper surface of the first insulating layer 12 protected by the resist layer 21 becomes the planarized surface 12a continued from the upper surface of the bottom pole layer 11. Then, the resist layer 21 is removed.

When the coil forming concave surface 12b is not formed in the first insulating layer 12, as shown in FIG. 4, the step shown in FIG. 13 is unnecessary.

Figure 14:
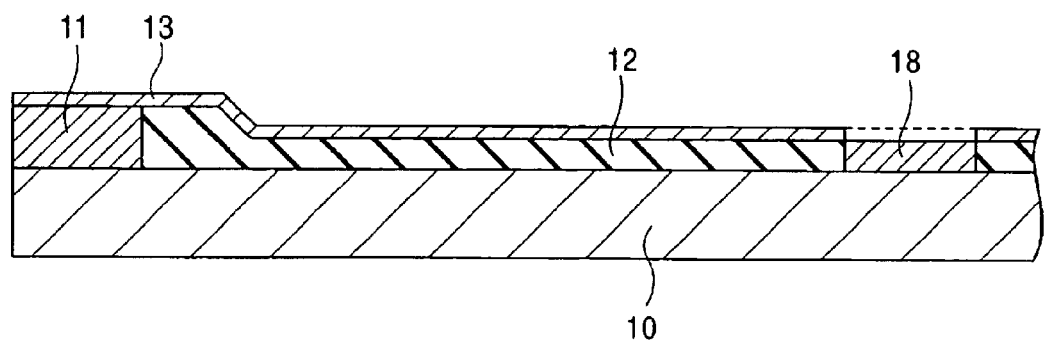
FIG. 14 is a partial sectional view showing a manufacturing step after the step shown in FIG. 13.

In the step shown in FIG. 14, the nonmagnetic gap layer 13 is formed on the bottom pole layer 11 and the first insulating layer 12 by sputtering. In this step, the gap layer is not formed on the lifting layer 18 because the base end 17c of the upper core layer 17 must be connected directly to the lifting layer 18 in a later step.

A method for avoiding the gap layer 13 from being formed on the lifting layer 18, for example, comprises forming a resist layer (not shown in the drawing) on the lifting layer 18, forming the gap layer 13 on the bottom pole layer 11 and the first insulating layer 12, and then removing the resist layer. Another method comprises forming the gap layer 13 on the lifting layer 18, protecting the bottom pole layer 11 and the first insulating layer 12 by the resist layer, and removing the portion of the gap layer 13, which is formed on the lifting layer 18, by etching.

The gap layer 13 may be formed only on the bottom pole layer 11. In this case, the layers except the bottom pole layer 11 are coated with a resist layer (not shown), the gap layer 13 is deposited on the bottom pole layer 11 by sputtering, and then the resist layer is removed.

Figure 15:
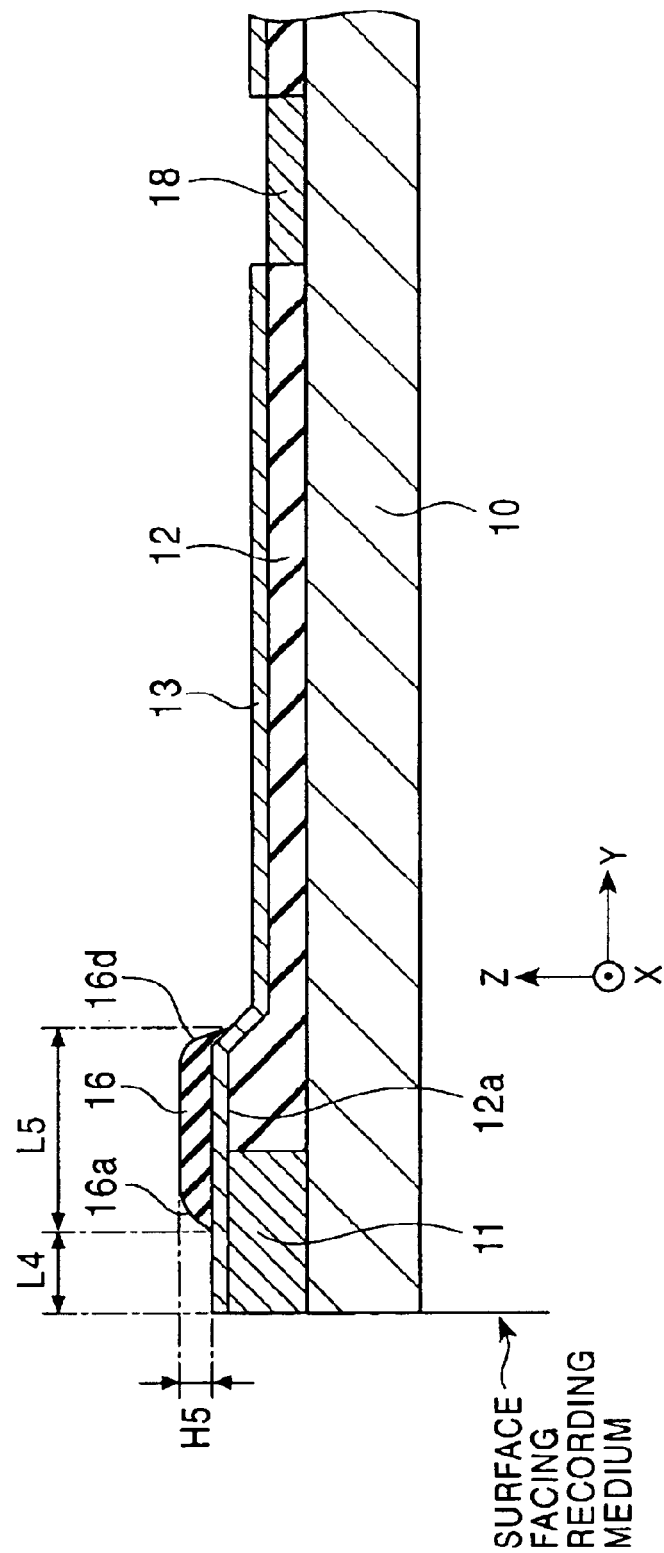
FIG. 15 is a partial sectional view showing a manufacturing step after the step shown in FIG. 14.

In the next step shown in FIG. 15, the partial insulating layer 16 is formed on the gap layer 13. The partial insulating layer 16 is formed to start from the position at the predetermined distance L4 from the surface facing the recording medium in the height direction (the Y direction), where the partial insulating layer 16 is opposed to the bottom pole layer 11 with the gap layer 13 provided therebetween. Although, in the step shown in FIG. 15, the partial insulating layer 16 is formed to extend to the planarized surface 12a formed on the first insulating layer 12, the partial insulating layer 16 may be formed only on the bottom pole layer 11 with the gap layer 13 provided therebetween. This results in the thin film magnetic head having the same structure as shown in FIG. 5.

In the present invention, the partial insulating layer 16 is preferably made of an organic insulating material such as resist, polyimide, or the like. Although the partial insulating layer 16 may be made of an inorganic insulating material such as $Al_2O_3$ or the like, the use of an inorganic insulating material requires a sputtering step and an etching step, thereby not only complicating the working process, but also influencing the other layers in the etching step.

On the other hand, with the use of an organic insulating material for forming the partial insulating layer 16, the partial insulating layer 16 can be formed by a relatively simple operation comprising coating and baking steps, thereby causing no adverse effect on the other layers.

The height dimension of the partial insulating layer 16 is set to H5, and the length dimension in the height direction is set to L5. However, since the partial insulating layer 16 is formed by coating and then baking, the partial insulating layer 16 is sagged to decrease the thickness of the partial insulating layer 16 at the time of coating, and the tip surface 16a and the rear end surface 16d of the partial insulating layer 16 are inclined or curved, as shown in FIG. 15, to increase the length dimension in the height direction at the time of coating. Therefore, in consideration of this point, the height dimension and the length dimension in the height direction of the partial insulating layer 16 must be set during coating.

Figure 16:
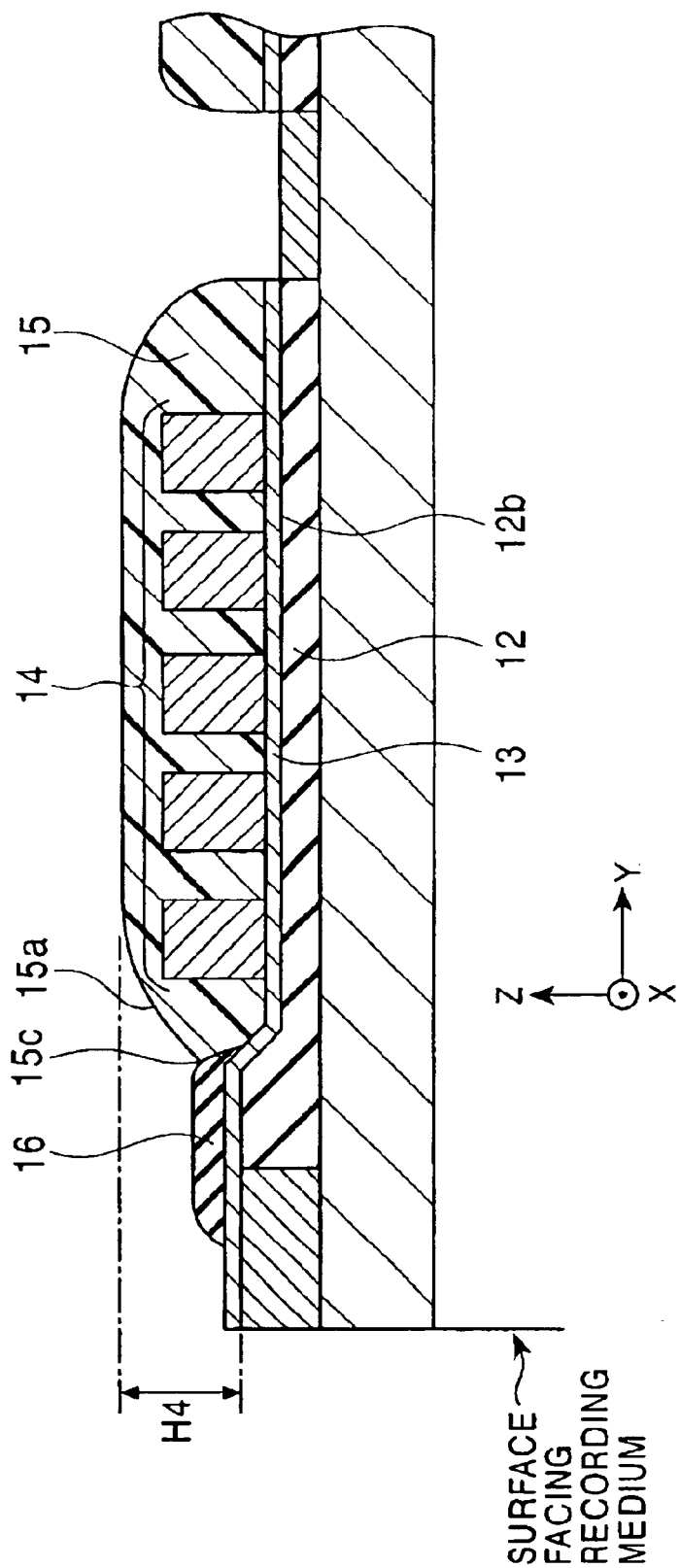
FIG. 16 is a partial sectional view showing a manufacturing step after the step shown in FIG. 15.

In the next step shown in FIG. 16, the coil layer 14 is spirally formed by plating on the coil forming surface 12b formed on the first insulating layer 12, through the gap layer 13. The coil layer 14 is made of a nonmagnetic conductive material having low electric resistance, such as Cu or the like.

Next, the coil layer 14 is coated with the second insulating layer 15 made of resist, polyimide or the like. The second insulating layer 15 is formed by coating and then baking.

As shown in FIG. 16, in the present invention, the bottom 15c of the tip surface 15a of the second insulating layer 15 must be joined to the top of the partial insulating layer 16. Therefore, in coating the second insulating layer 15, the second insulating layer 15 is coated on the partial insulating layer 16 and the coil layer 14.

Next, the upper core layer 17 is patterned by, for example, a frame plating method to extend from the gap layer 13 exposed on the side facing the recording medium to the partial insulating layer 16 and the second insulating layer 15 in the backward height direction. The base end 17c of the upper core layer 17 is connected to the lifting layer 18. As a result, the thin film magnetic head shown in FIG. 1 is completed.

As shown in FIG. 2, the upper core layer 17 comprises the narrow tip region 17a formed with the track width Tw to extend from the surface facing the recording medium in the height direction, and the rear end region 17b formed behind the tip region 17a in the height direction so that the width dimension in the track width direction gradually increases in the height direction from the end edge of the tip region 17a.

The tip region 17a is formed to extend from the gap layer 13 to the partial insulating layer 16, but the partial insulating layer 16 has a height dimension H5 of 0.1 $\mu$m to 1.0 $\mu$m, and thus comprises a thin film.

Therefore, in patterning the tip region 17a, the step formed between the partial insulating layer 16 and the gap layer 13 causes no deterioration in patterning precision, thereby permitting high-precision formation of the tip region 17a with the track width Tw.

Particularly, as shown in FIG. 16, the coil forming concave surface 12b is formed in the first insulating layer 12, and the coil layer 14 is formed on the coil forming surface 12b with the gap layer 13 provided therebetween. Therefore, the amount of rising H4 of the second insulating layer 15 from the upper surface of the bottom pole layer 11 (considered as the reference plane) can be decreased, and thus the upper core layer 17 can be patterned in the predetermined shape with high precision on the gap layer 13, the partial insulating layer 16 and the second insulating layer 15.

In the steps shown in FIGS. 11 to 16, the lower core layer 10 and the bottom pole layer 11 are separately formed. However, in this case, a magnetic material having a higher saturation magnetic flux density than the lower core layer 10 can be used for the bottom pole layer 11.

In integrally forming the lower core layer 10 and the bottom pole layer 11, a magnetic material layer is formed to a thickness corresponding to the total thickness of the lower core layer 10 and the bottom pole layer 11, and the portion of the magnetic material layer, which constitutes the bottom pole layer 11, is coated with a resist layer, the portion of the magnetic material layer not coated with the resist layer being cut off.

Next, the method of forming the bottom pole layer 30 of the thin film magnetic head shown in FIG. 6 will be described below with reference to FIGS. 17 and 18.

Figure 17:
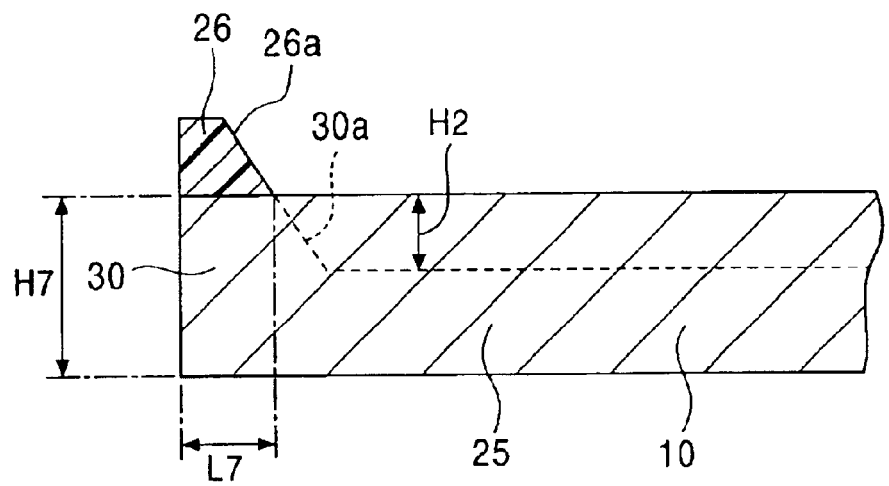
FIG. 17 is a partial sectional view showing a manufacturing step after the step shown in FIG. 16.

FIG. 17 shows the case in which the lower core layer 17 and the bottom pole layer 30 are formed integrally. As shown in FIG. 17, a magnetic material layer 25 is formed to a thickness H7, and a resist layer 26 is formed on the magnetic material layer 25 so that the bottom has a length dimension L7 in the height direction from the surface facing recording medium.

The resist layer 26 is baked to form the rear end surface 26a inclined or curved so that the thickness gradually decreases in the backward height direction. Next, the portion of the magnetic material layer 25 which is not coated with the resist layer 26 is etched off to a depth dimension H2. Then, the resist layer 26 is removed.

As a result, the magnetic material layer 25 has a shape in which the bottom pole layer 30 protrudes upward from the lower core layer 10. In the present invention, since the rear end surface 26a of the resist layer 26 is inclined or curved, the rear end surface 30a of the bottom pole layer 30 is also inclined or curved. The subsequent manufacturing steps are the same as FIGS. 12, 13, 14 and 16.

Figure 18:
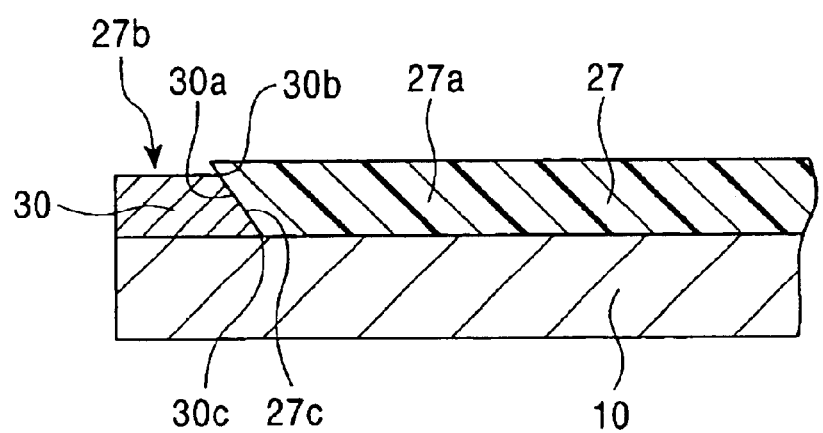
FIG. 18 is a partial sectional view showing a step in a method of manufacturing the thin film magnetic head shown in FIG. 6.

The bottom pole layer 30 may be formed as shown in FIG. 18. In the step shown in FIG. 18, a resist layer 27 is formed on the lower core-layer 10, and the portion 27a of the resist layer 27 except the pattern for the bottom pole layer 30 is exposed. Then, the unexposed pattern portion 27b for the bottom pole layer is removed. This is a so-called image reverse method that is reversed from the step shown in FIG. 11 in which the portion in the aperture pattern 20a is exposed and developed.

The tip surface 27c of the resist layer 27 left by the image reverse method is inclined or curved so that the thickness of the resist layer 27 gradually decreases toward the surface side facing the recording medium. The bottom pole layer 30 is grown by plating in the pattern 27b to form the rear end surface 30a inclined or curved so that the thickness of the bottom pole layer 30 gradually decreases in the heat direction. Then, the resist layer 27 is removed. The subsequent steps are the same as FIGS. 12, 13, 14 and 16.

The method of manufacturing the thin film magnetic head shown in FIG. 7 comprises forming the bottom pole layer 31 on the lower core layer 10 by the same step as FIG. 11 using the resist layer, coating the tip side of the upper surface of the bottom pole layer 31, and partly etching off the rear end portion of the bottom pole layer 31, which is not coated with the resist layer, to form the bottom pole layer 31 having the rear end portion 31c projecting backward in the height direction through the step 31b. The subsequent steps are the same as FIGS. 12, 13, 14 and 16.

As described above, the method of manufacturing the thin film magnetic head shown in FIGS. 11 to 16 can easily form the partial insulating layer 16 in the predetermined shape on the planarized surface, and pattern the tip region 17a of the upper core layer 17 with high precision to extend from the gap layer 13 to the partial insulating layer 16.

The methods of manufacturing the thin film magnetic head shown in FIGS. 17 and 18 can easily form the rear end surface 30a of the bottom pole layer 30 that is inclined backward in the height direction.

In the thin film magnetic head formed through the step shown in FIG. 17 or 18, the tip region 17a of the upper core layer 17 can be formed on the completely planarized surface to permit high-precision patterning of the tip region 17a.

In the thin film magnetic head manufactured by any one of the above-described methods of the present invention, the tip region 17a of the upper core layer has substantially the same length as the conventional head, and even with this length dimension, magnetic saturation of the tip region 17a can be appropriately suppressed. Therefore, the NLTS characteristics and the PW50 characteristic can be improved, and a thin film magnetic head causing less side fringing can be manufactured.

EXAMPLES

Figure 25:
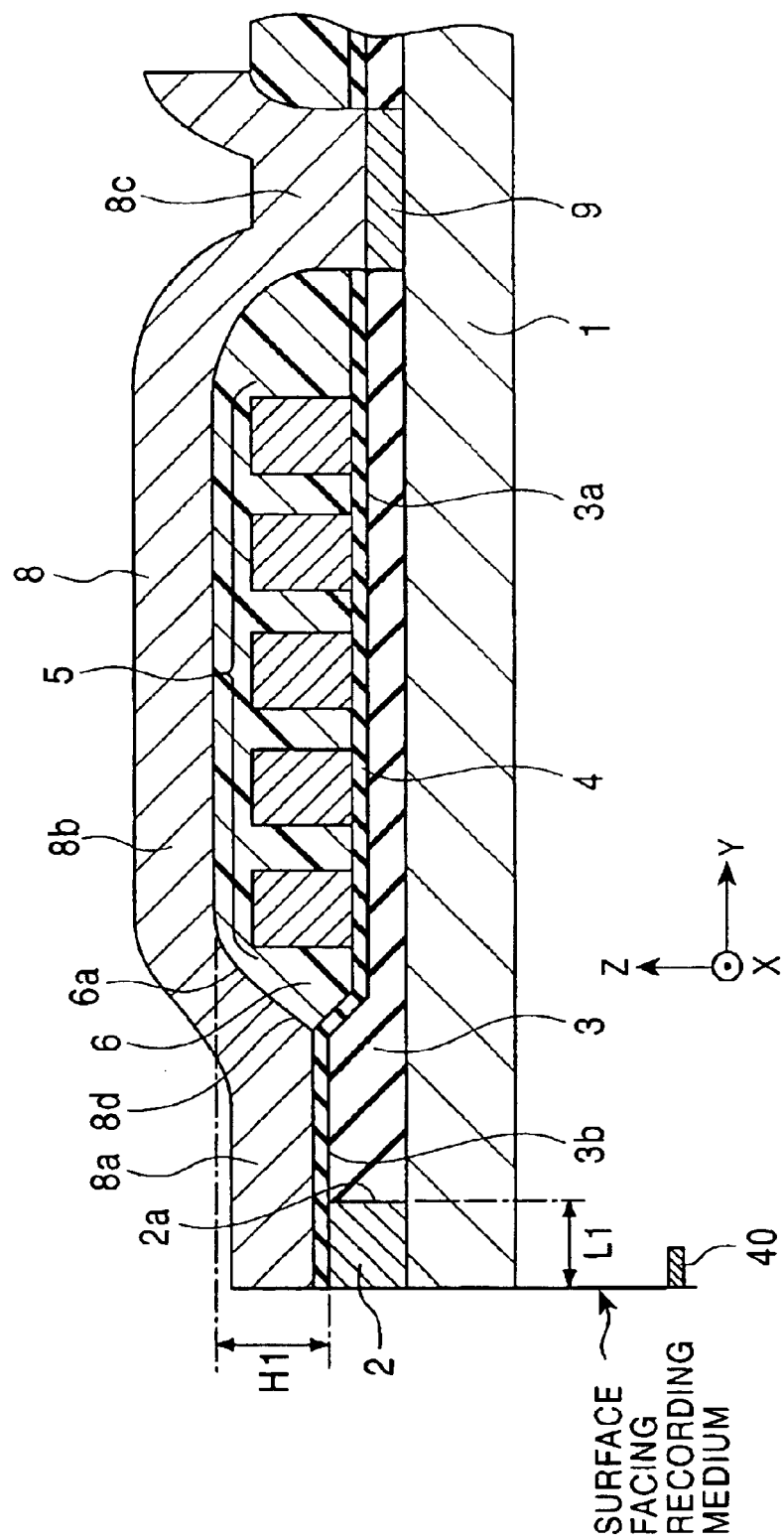
FIG. 25 is a longitudinal partial sectional view showing the structure of an improved example of the thin film magnetic head shown in FIG. 24.
Figure 26:
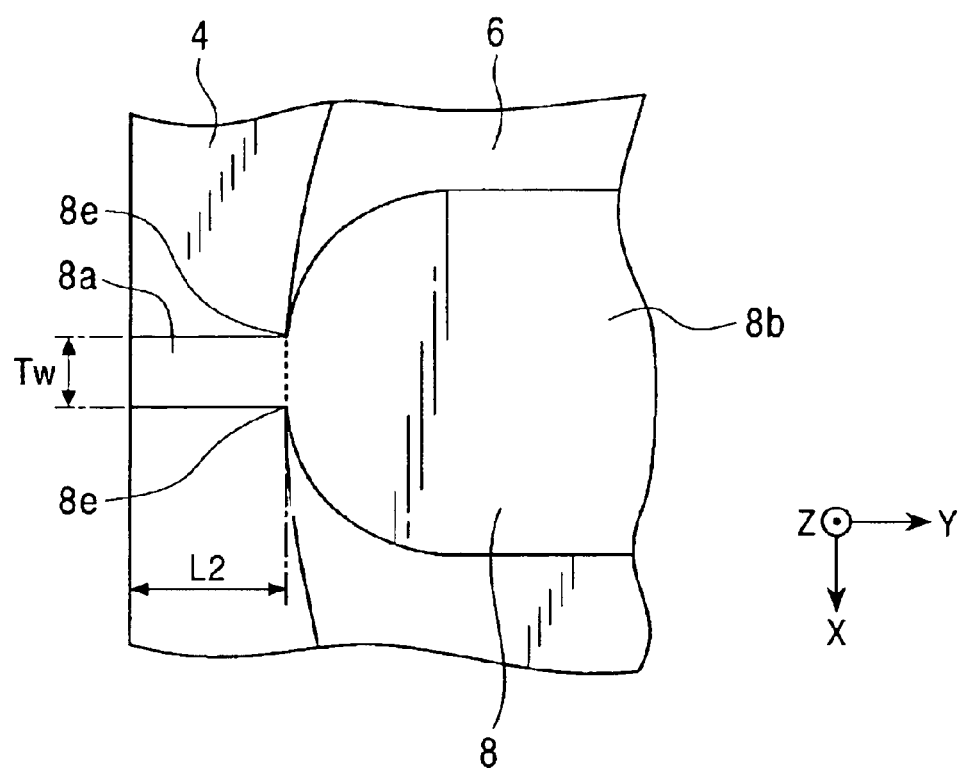
FIG. 26 is a partial plan view of the thin film magnetic head shown in FIG. 25.

The thin film magnetic head shown in FIG. 1 was formed as an example, and the conventional thin film magnetic head shown in FIG. 25 was formed as a comparative example. Each of the thin film magnetic heads was measured with respect to the overwrite performance, the NLTS characteristic, the PW50 characteristic, and ΔTw (magnetic track width Tw-Mag—optical track width Tw-Opti).

Each of the thin film magnetic heads was formed with the standardized dimensions below. The track width was 0.55 $\mu$m, and the gap length G1, i.e., the thickness of the gap layer 13, was 0.2 $\mu$m. In the MR head formed below each of the thin film magnetic heads (inductive heads) shown in FIGS. 1 and 25, the length dimension of the magnetoresistive element (spin valve film) 40 in the height direction (the Y direction) was 0.3 $\mu$m.

The length dimension of the tip region 17a of the upper core layer 17 was 2.5 m from the height side of the magnetoresistive element. Namely, both the length dimensions L6 and L1 of the tip regions 17a in the height direction shown in FIGS. 1 and 25, respectively, are 2.5 $\mu$m +0.3 $\mu$m, i.e., 2.8 $\mu$m.

In the thin film magnetic head shown in FIG. 1, the thickness dimension H5 of the partial insulating layer 16 is 0.6 $\mu$m, and the distance from the height side of the magnetoresistive element to the rear end surface 11a of the bottom pole layer 11 is 1.2 $\mu$m. Namely, in FIG. 1, the length dimension L3 of the bottom pole layer 11 in the height direction is 1.2 $\mu$m+0.3 $\mu$m, i.e., 1.5 $\mu$m.

First, the relation between the overwrite performance and the gap depth Gd was measured. The gap depth Gd corresponds to L4 shown in FIG. 1 and L1 shown in FIG. 25. The term "overwrite" (OW) means overwriting, and the OW performance is evaluated by overwriting with a high frequency on a signal recorded with a low frequency, and then measuring a decrease in the residual output of the signal recorded with the low frequency from the output of the signal recorded with the low frequency before overwriting with the high frequency. The higher an absolute value is, the higher the OW performance is.

The experiment was carried out with a low frequency of 12 MHz, and a high frequency of 72 MHz. The experimental results are shown in FIG. 19.

Figure 19:
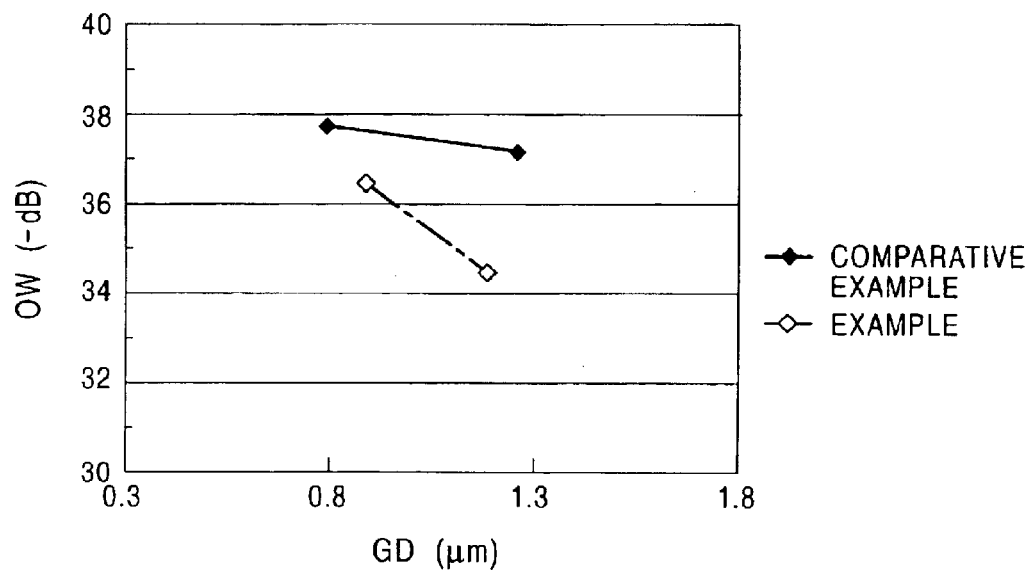
FIG. 19 is a graph showing the relation between the gap depth Gd and the overwrite performance of a thin film magnetic head of each of an example and a comparative example.

FIG. 19 indicates that in both the comparative example and the examples, the overwrite performance deteriorates as the gap depth Gd increases. This is due to the fact that the amount of the magnetic flux flowing from the tip region 17a of the upper core layer 17 to the bottom pole layer 11 is increased until the magnetic flux in the tip region 17a reaches the surface facing the recording medium, decreasing the magnetic flux density of the tip region 17a.

However, FIG. 19 shows that the comparative example exhibits the higher overwrite performance than the example. This is due to the fact that in the example, the partial insulating layer 16 is provided to increase the length dimension L3 of the bottom pole layer, thereby increasing the amount of the magnetic flux leaking from the tip region 17a of the upper core layer 17 to the bottom pole layer 11, as compared with the comparative example.

Next, the relation between the NLTS characteristic and the gap depth Gd was examined. NLTS refers to a phase lead of the leakage magnetic field produced in the magnetic gap between the upper core layer and the bottom pole layer of the inductive head. The phase lead is caused by a nonlinear distortion due to the influence of a leakage magnetic field leaking from a magnetic recorded signal previously recorded on the recording medium toward the head.

The NLTS characteristic was measured by using a quintic harmonic measurement under conditions of 82.5 MHz and 413 kFCI. The NLTS (%) is preferably as low as possible.

Figure 20:
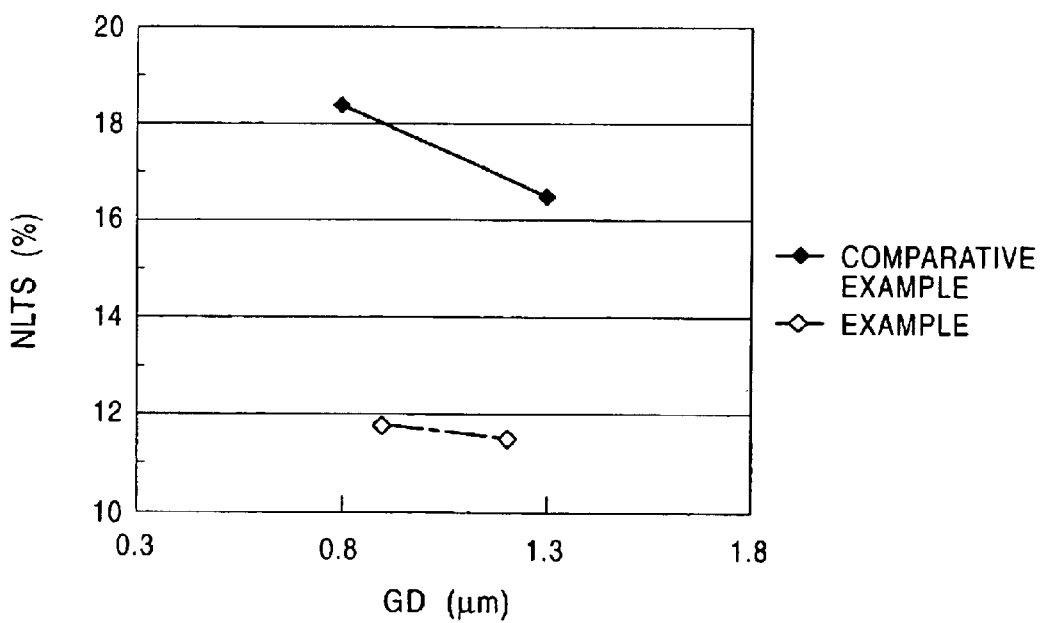
FIG. 20 is a graph showing the relation between the gap depth Gd and the NLTS characteristic of a thin film magnetic head of each of an example and a comparative example.

FIG. 20 indicates that in both the example and the comparative example, the NLTS (%) decreases, i.e., the NLTS characteristic is improved, as the gap depth Gd increases.

FIG. 20 also indicates that NLTS (%) of the example is smaller than the comparative example, and the NLTS characteristics of the example is good. This is due to the fact that the magnetic flux partly leaks from the tip region 17a of the upper core layer 17 to the bottom pole layer 11 through the partial insulating layer 16 to suppress magnetic saturation of the tip region 17a.

In the present invention, the relation between the PW50 characteristic and the gap depth Gd was then measured.

The PW50 characteristic represents the measurement of a half width of a solitary wave, and the recording resolution is improved as the half width decreases.

Figure 21:
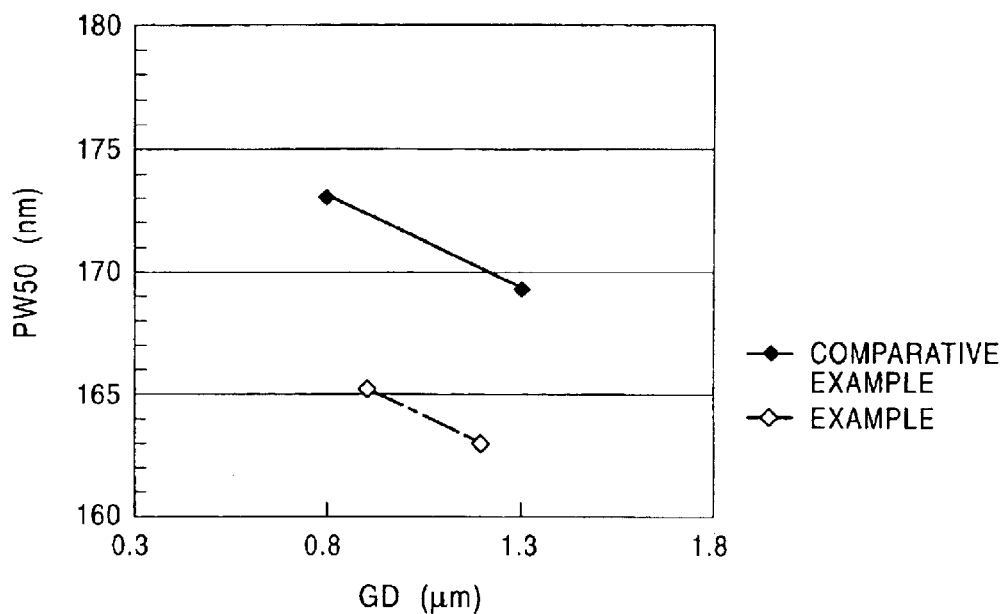
FIG. 21 is a graph showing the relation between the gap depth Gd and the PW50 characteristic of a thin film magnetic head of each of an example and a comparative example.

FIG. 21 indicates that in both the example and the comparative example, the half width decreases, i.e., the PW characteristic is improved, as the gap depth Gd increases. However, in the example, the half width can be decreased to improve the PW characteristic, as compared with the comparative example. Like the NLTS characteristic, this is because, in the example, the magnetic flux partially leaks from the tip region 17a of the upper core layer 17 to the bottom pole layer 11 through the partial insulating layer 16 to suppress magnetic saturation of the tip region 17a.

Next, the relation between ΔTw (magnetic track width Tw-Mag—optical track width Tw-Opti) and the gap depth was measured. The magnetic track width Tw-Mag represents the recording width on a recording medium in actual writing by using each of the thin film magnetic heads shown in FIGS. 1 and 25, and the optical track width Tw-Opti represents the actual width dimension of the tip region 17a of the upper core layer 17 exposed at the surface facing the recording medium.

The ΔTw obtained by subtracting the optical track width Tw-Opti from the magnetic track width Tw-Mag represents the amount of side fringing, and it is thus said that the suppression of side fringing increases as the ΔTw decreases.

Figure 22:
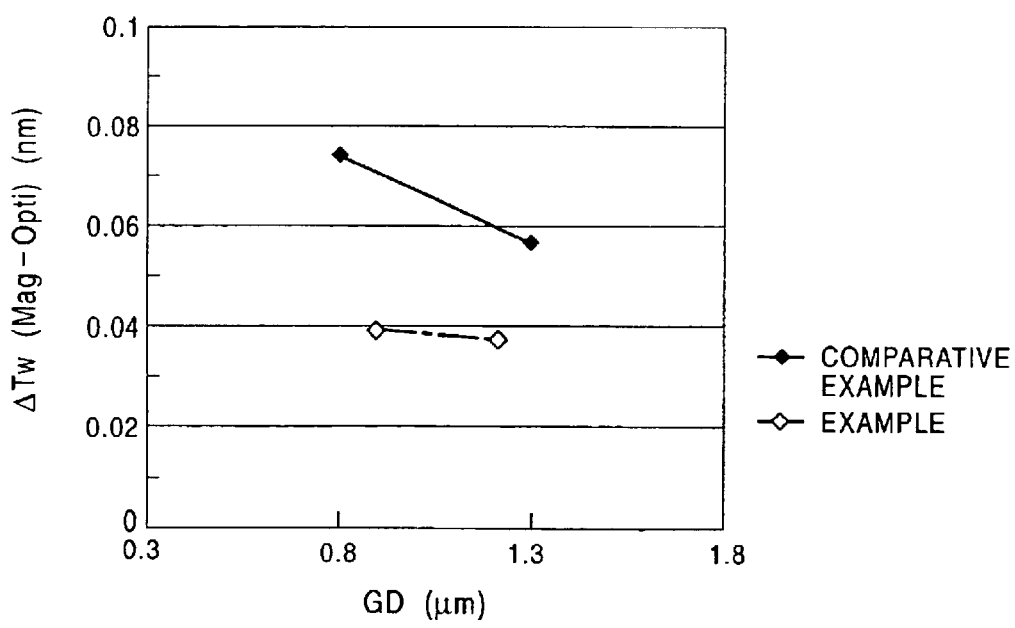
FIG. 22 is a graph showing the relation between the gap depth Gd and the $\Delta$Tw (magnetic track width Tw-Mag—optical track width Tw-Optic) characteristic of a thin film magnetic head of each of an example and a comparative example.

FIG. 22 indicates that in both the example and the comparative example, the ΔTw decreases as the gap depth Gd increases, but the ΔTw of the example can be decreased to effectively suppress the amount of side fringing, as compared with the comparative example. This is because, in the example, the magnetic flux partially leaks from the tip region 17a of the upper core layer 17 to the bottom pole layer 11 through the partial insulating layer 16 to suppress magnetic saturation of the tip region 17a, thereby preventing the magnetic flux from leaking from the surface facing the recording medium beyond the track width Tw.

Figure 23:
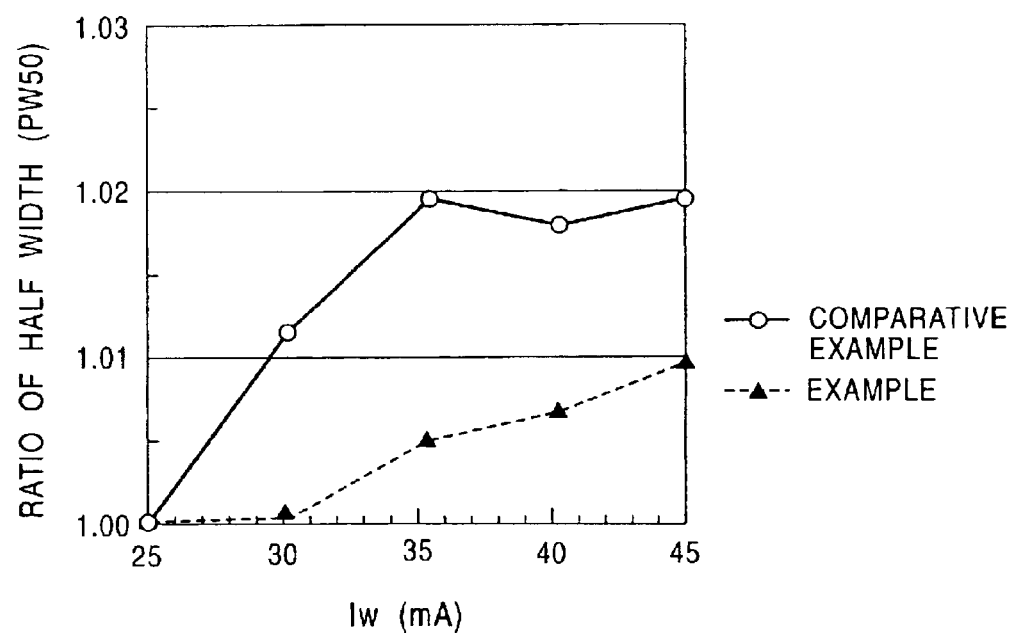
FIG. 23 is a graph showing the PW50 characteristic of a thin film magnetic head of each of an example and a comparative example, in which the ratio of PW50 with a recording current to PW50 with a recording current of 25 mA is shown on the ordinate.
Figure 24:
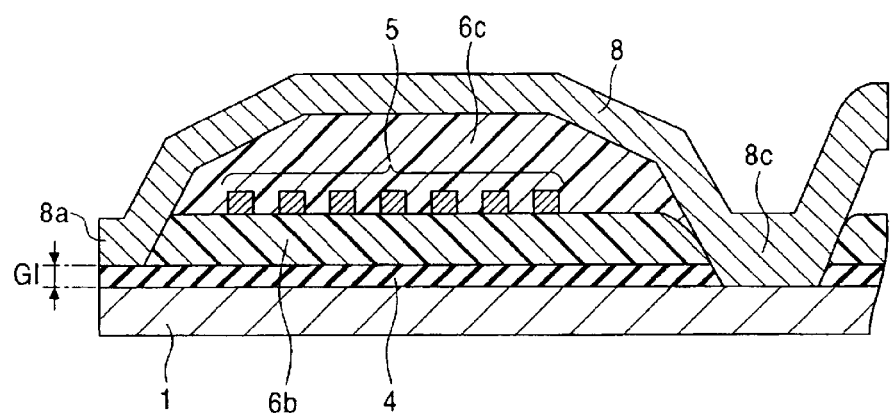
FIG. 24 is a partial longitudinal sectional view showing the structure of a conventional thin film magnetic head.

FIG. 23 is a graph showing the relation between the PW50 characteristic and the recording current.

In experiment, in the thin film magnetic head of the example shown in FIG. 1, the length dimension of the tip region of the upper core layer in the height direction was 2.8 μm, and the gap depth Gd was 0.9 μm. In the thin film magnetic head of the comparative example shown in FIG. 25, the length dimension of the tip region of the upper core layer in the height direction was 2.8 μm, and the gap depth Gd was 1.3 μm. The relation between the recording current and the PW50 characteristic was examined for each of the example and the comparative example.

The graph of FIG. 23 shows the ratio of a half width with a recording current Iw to a half width of 1.00 with a recording current Iw of 25 mA.

FIG. 23 indicates that the PW50 characteristics of the example deteriorates less as the recording current IW increases in comparison to the comparative example.

As described above, in a thin film magnetic head of the present invention, the overwrite performance slightly deteriorates in comparison to the thin film magnetic head shown in FIG. 25, and thus the good overwrite performance can be obtained. Furthermore, the NLTS characteristic and the PW50 characteristics can be improved, and the occurrence of side fringing can be effectively suppressed, as compared with the conventional thin film magnetic head shown in FIG. 25.

In the thin film magnetic head of the present invention described in detail above, the space between a tip region of an upper core layer and a bottom pole layer comprises a portion extending from a surface facing a recording medium in the height direction, in which only a gap layer is present, the gap depth being regulated by the end edge of the portion. The space further comprises a portion extending backward from the end edge in the height direction, in which an insulating layer is present together with the gap layer or with the gap layer removed so that the gap between the tip region and the bottom pole layer in the portion comprising the insulating layer is larger than that in the portion comprising only the gap layer. In this construction, a magnetic flux from the tip region partially leaks to the bottom pole layer through the insulating layer to decrease the magnetic flux density of the tip region. Therefore, magnetic saturation of the tip region can be appropriately suppressed without an increase in the length dimension of the tip region in the height direction, thereby decreasing the width of magnetization reversal on a magnetization curve and improving the NLTS characteristic and the PW50 characteristic as compared with a conventional head. Also, in the thin film magnetic head of the present invention, the occurrence of side fringing can be effectively suppressed. It is further possible to comply with a narrower track and maintain the overwrite performance sufficient.

Specifically, in the thin film magnetic head of the present invention, the insulating layer comprises a partial insulating layer. In this construction, the above-descried effects can be obtained, and the tip region of the upper core layer can be patterned with high precision. Alternatively, the rear end surface of the bottom pole layer may be inclined or curved so that the thickness of the bottom pole layer gradually decreases in the height direction, and a first insulating layer may be formed as the insulating layer on the rear end surface.

As described above, the present invention can manufacture a thin film magnetic head which is capable of appropriately suppressing magnetic saturation of the tip region of the upper core layer even when the recording current increases accompanying an increase in the recording density in future, and which exhibits good NLTS characteristic and PW50 characteristic, and a small amount of side fringing. It is also possible to accommodate a narrower track and maintain the overwrite performance sufficiently.

What is claimed is:

1. A thin film magnetic head comprising a lower core layer, a bottom pole layer formed on the lower core layer separately therefrom or integrally therewith, a nonmagnetic gap layer formed on at least the bottom pole layer, an upper core layer to be joined to the top of the gap layer at a surface facing a recording medium, and a coil layer formed behind the bottom pole layer in the height direction, for inducing a recording magnetic field in the lower core layer and the upper core layer, wherein the upper core layer comprises a tip region and a rear end region, the tip region being exposed with a track width at the surface facing the recording medium, the rear end region extending backward from the end edge of the tip region in the height direction so that the width dimension in the track width direction gradually increases in the height direction, wherein the space between the tip region of the upper core layer and the bottom pole layer comprises a first portion extending backward from the surface facing the recording medium in the height direction, in which only a gap layer is present, and a gap depth is regulated by the end edge of the portion, and a second portion extending backward from the end edge of the first portion in the height direction, in which a partial insulating layer is formed on the gap layer and on a first insulating layer, and in which the partial insulating layer is present together with the gap layer or with the gap layer removed so that the gap between the tip region and the bottom pole layer in the portion comprising the partial insulating layer is larger than the gap in the portion comprising only the gap layer, wherein the rear end surface of the bottom pole layer is inclined or curved so that the thickness of the bottom pole layer gradually decreases in the backward height direction, and the gap depth is regulated by the distance between the top of the rear end surface and the surface facing the recording medium, and wherein the first insulating layer is formed to extend from the top of the rear end surface of the bottom pole layer to the lower core layer, a planarized surface is formed at the top of the first insulating layer to be continued from the top of the bottom pole layer, and the tip region of the upper core layer is formed to extend from the gap layer formed on the bottom pole layer to the gap layer formed on the planarized surface or to the planarized surface.

2. A thin film magnetic head according to claim 1, wherein the first insulating layer has a coil forming surface which is formed behind the planarized surface in the height direction and lower than the planarized surface, the coil layer being formed on the coil forming surface through the gap layer or directly.

* * * * *